US012657232B2

(12) United States Patent
Javari et al.

(10) Patent No.: US 12,657,232 B2
(45) Date of Patent: Jun. 16, 2026

(54) DOCUMENT RECOMMENDATIONS BASED ON CONTEXT-AWARE EMBEDDINGS

(71) Applicant: HOME DEPOT INTERNATIONAL, INC., Atlanta, GA (US)

(72) Inventors: Amin Javari, Smyrna, GA (US); Haochen Liu, Lansing, MI (US); Xiquan Cui, Brookhaven, GA (US)

(73) Assignee: HOME DEPOT PRODUCT AUTHORITY, LLC, Atlanta, GA (US)

( * ) Notice: Subject to any disclaimer, the term of this patent is extended or adjusted under 35 U.S.C. 154(b) by 157 days.

(21) Appl. No.: 18/021,050

(22) PCT Filed: Feb. 10, 2023

(86) PCT No.: PCT/US2023/062411

§ 371 (c)(1),
(2) Date: Feb. 13, 2023

(87) PCT Pub. No.: WO2023/154882

PCT Pub. Date: Aug. 17, 2023

(65) Prior Publication Data

US 2024/0273128 A1 Aug. 15, 2024

Related U.S. Application Data

(60) Provisional application No. 63/308,662, filed on Feb. 10, 2022.

(51) Int. Cl.
G06F 16/358 (2025.01)
G06F 16/335 (2019.01)

(52) U.S. Cl.
CPC .......... G06F 16/358 (2019.01); G06F 16/335 (2019.01)

(58) Field of Classification Search
CPC ...... G06F 16/358; G06F 16/335; G06F 16/35; G06F 16/954
See application file for complete search history.

(56) References Cited

U.S. PATENT DOCUMENTS

2008/0243637 A1* 10/2008 Chan ...................... G06Q 30/02
                                                    705/26.1
2012/0191716 A1   7/2012 Omoigui
2017/0091320 A1   3/2017 Psota et al.
2019/0065606 A1   2/2019 Jiang et al.
                          (Continued)

OTHER PUBLICATIONS

ISA/US, ISR/WO issued in appl. No. PCT/US23/62411, dated May 15, 2023, 13 pgs.
                          (Continued)

*Primary Examiner* — Hares Jami
(74) *Attorney, Agent, or Firm* — Greenberg Traurig, LLP

(57) ABSTRACT

A method for providing document category recommendations may include training a machine learning algorithm; receiving, from a user, a selection of an anchor document; retrieving a user co-viewing sequence; generating, via the trained machine learning algorithm, a sequence embeddings set based on the anchor document and the user co-viewing sequence; comparing the generated embeddings set to respective embeddings for a plurality of candidate sets; determining the candidate set closest to the generated embeddings; and presenting at least one category from the closest candidate set.

40 Claims, 13 Drawing Sheets

(56) References Cited

U.S. PATENT DOCUMENTS

| | | | | |
|---|---|---|---|---|
| 2020/0104898 | A1* | 4/2020 | Cui | G06Q 30/0633 |
| 2021/0056385 | A1* | 2/2021 | Mane | G06N 3/045 |
| 2021/0233149 | A1* | 7/2021 | Korpeoglu | G06F 16/90328 |
| 2021/0241343 | A1* | 8/2021 | Arora | G06Q 30/0633 |
| 2021/0390609 | A1* | 12/2021 | Trinh | G06N 3/082 |
| 2022/0230226 | A1* | 7/2022 | Shahrasbi | G06N 20/20 |
| 2022/0245341 | A1* | 8/2022 | Kedia | G06N 20/00 |
| 2022/0245703 | A1* | 8/2022 | Chaganti | G06Q 30/0623 |
| 2022/0318947 | A1* | 10/2022 | Davies | G06T 3/40 |
| 2023/0162258 | A1* | 5/2023 | Das Gupta | G06Q 30/0633 |
| | | | | 705/26.7 |

OTHER PUBLICATIONS

Rakesh Agarwal, Ramakrishnan Srikant, et al. 1994. Fast algorithms for mining association rules. In Proc. 20th int. conf. very large data bases, VLDB, vol. 1215. Citeseer, 487-499.

Lei Jimmy Ba, Ryan Kiros, and Geoffrey E. Hinton. 2016. Layer Normalization. CoRR abs/1607.06450 (2016). arXiv:1607.06450 http://arxiv.org/abs/1607.06450.

Oren Barkan and Noam Koenigstein. 2016. Item2vec: neural item embedding for collaborative filtering. In 2016 IEEE 26th International Workshop on Machine Learning for Signal Processing (MLSP). IEEE, 1-6.

Mikhail Belkin, Partha Niyogi, and Vikas Sindhwani. 2006. Manifold regularization: A geometric framework for learning from labeled and unlabeled examples. Journal of machine learning research 7, 11 (2006).

Jianxin Chang, Chen Gao, Xiangnan He, Depeng Jin, and Yong Li. 2021. Bundle Recommendation and Generation with Graph Neu al Networks. IEEE Transactions on Knowledge and Data Engineering (2021).

Yu Chen, Lingfei Wu, and Mohammed J Zaki. 2019. Deep iterative and adaptive learning for graph neural networks. arXiv preprint arXiv:1912.07832 (2019).

Jacob Devlin, Ming-Wei Chang, Kenton Lee, and Kristina Toutanova. 2019. Bert: Pre-training of Deep Bidirectional Transformers for Language Understanding. In Proceedings of the 2019 Conference of the North American Chapter of the Association for Computational Linguistics: Human Language Technologies, vol. 1 (Long and Short Papers). 4171-4186.

M Dhanabhakyam and M Punithavalli. 2011. A survey on data mining algorithm for market basket analysis. Global Journal of Computer Science and Technology (2011).

Bahare Fatemi, Layla El Asri, and Seyed Mehran Kazemi. 2021. Slaps: Self-Supervision Improves Structure Learning for Graph Neural Networks. arXiv preprint arXiv:2102.05034 (2021).

Luca Franceschi, Mathias Niepert, Massimiliano Pontil, and Xiao He. 2019. Learning discrete structures for graph neural networks. In International conference on machine learning. PMLR, 1972-1982.

Spyros Gidaris and Nikos Komodakis. 2019. Generating classification weights with gnn denoising autoencoders for few-shot learning. In Proceedings of the IEEE/CVF conference on computer vision and pattern recognition. 21-30.

Mihajlo Grbovic, Vladan Radosavljevic, Nemanja Djuric, Narayan Bhamidipati, Jaikit Savla, Varun Bhagwan, and Doug Sharp. 2015. E-commerce in your inbox: Product recommendations at scale. In Proceedings of the 21th ACM SIGKDD international conference on knowledge discovery and data mining. 1809-1818.

Savi Gupta and Roopal Mamtora. 2014. A survey on association rule mining in market basket analysis. International Journal of Information and Computation Technology 4, 4 (2014), 409-414.

Aric Hagberg, Pieter Swart, and Daniel A. Schult. 2008. Exploring network structure, dynamics, and function using NetworkX. Technical Report. Los Alamos National Lab.(LANL), Los Alamos, NM (United States).

Jonathan Halcrow, Alexandru Mosoi, Sam Ruth, and Bryan Perozzi. 2020. Grale: Designing networks for graph learning. In Proceedings of the 26thACMSIGKDD International Conference on Knowledge Discovery & Data Mining. 2523-2532.

Kaiming He, Xiangyu Zhang, Shaoqing Ren, and Jian Sun. 2016. Deep Residual Learning for Image Recognition. In 2016 IEEE Conference on Computer Vision and Pattern Recognition, CVPR 2016, Las Vegas, NV, USA, Jun. 27-30, 2016. 770-778. https://doi.org/10.1109/CVPR.2016.90.

Haoji Hu, Xiangnan He, Jinyang Gao, and Zhi-Li Zhang. 2020. Modeling personalized item frequency information for next-basket recommendation. In Proceedings of the 43rd International ACM SIGIR Conference on Research and Development in Information Retrieval. 1071-1080.

Di Jin, Xinxin You, Weihao Li, Dongxiao He, Peng Cui, Françoise Fogelman-Soulié, and Tanmoy Chakraborty. 2019. Incorporating network embedding into markov random field for better community detection. In Proceedings of the AAAI Conference on Artificial Intelligence, vol. 33. 160-167.

Manpreet Kaur and Shivani Kang. 2016. Market Basket Analysis: Identify the changing trends of market data using association rule mining. Procedia computer science 85 (2016), 78-85.

Zhiwei Liu, Xiaohan Li, Ziwei Fan, Stephen Guo, Kannan Achan, and S Yu Philip. 2020. Basket recommendation with multi-intent translation graph neural network. In 2020 IEEE International Conference on Big Data (Big Data). IEEE, 728-737.

Zhiwei Liu, Mengting Wan, Stephen Guo, Kannan Achan, and Philip S Yu. 2020. Basconv: Aggregating heterogeneous interactions for basket recommendation with graph convolutional neural network. In Proceedings of the 2020 Siam International Conference on Data Mining. Siam, 64-72.

Meilian Lu, Zhenglin Zhang, Zhihe Qu, and Yu Kang. 2018. Lpanni: Overlapping community detection using label propagation in large-scale complex networks. IEEE Transactions on Knowledge and Data Engineering 31, 9 (2018), 1736-1749.

Tomas Mikolov, Kai Chen, Greg Corrado, and Jeffrey Dean. 2013. Efficient estimation of word representations in vector space. arXiv preprint arXiv:1301.3781 (2013).

Troy Raeder and Nitesh V Chawla. 2011. Market basket analysis with networks. Social network analysis and mining 1, 2 (2011), 97-113.

Sebastián A Ríos and Ivan F Videla-Cavieres. 2014. Generating groups of products using graph mining techniques. Procedia Computer Science 35 (2014), 730-738.

Oleksandr Shchur and Stephan Günnemann. 2019. Overlapping community detection with graph neural networks. arXiv preprint arXiv:1909.12201 (2019).

Mauricio A Valle, Gonzalo A Ruz, and Rodrigo Morrás. 2018. Market basket analysis: Complementing association rules with minimum spanning trees. Expert Systems with Applications 97 (2018), 146-162.

Ashish Vaswani, Noam Shazeer, Niki Parmar, Jakob Uszkoreit, Llion Jones, Aidan N. Gomez, Lukasz Kaiser, and Illia Polosukhin. 2017. Attention is All you Need. In Advances in Neural Information Processing Systems 30: Annual Conference on Neural Information Processing Systems 2017, Dec. 4-9, 2017, Long Beach, CA, USA. 6000-6010. http://papers.nips.cc/paper/7181-attentionis-all-you-need.

Ivan F Videla-Cavieres and Sebastian A Rios. 2014. Extending market basket analysis with graph mining techniques: A real case. Expert Systems with Applications 41, 4 (2014), 1928-1936.

Mengting Wan, Di Wang, Jie Liu, Paul Bennett, and Julian McAuley. 2018. Representing and recommending shopping baskets with complementarity, compatibility and loyalty. In Proceedings of the 27th ACM International Conference on Information and Knowledge Management. 1133-1142.

Shengxian Wan, Yanyan Lan, Pengfei Wang, Jiafeng Guo, Jun Xu, and Xueqi Cheng. 2015. Next Basket Recommendation with Neural Networks. In RecSys Posters.

C Wang, S Pan, R Hu, G Long, J Jiang, and C Zhang. 2019. Attributed Graph Clustering: A Deep Attentional Embedding Approach. In International Joint Conference on Artificial Intelligence. International Joint Conferences on Artificial Intelligence.

Pengfei Wang, Jiafeng Guo, Yanyan Lan, Jun Xu, Shengxian Wan, and Xueqi Cheng. 2015. Learning hierarchical representation model

(56) References Cited

OTHER PUBLICATIONS for nextbasket recommendation. In Proceedings of the 38th International ACM SIGIR conference on Research and Development in Information Retrieval. 403-412.

Xuan Wu, Lingxiao Zhao, and Leman Akoglu. 2018. A quest for structure: jointly learning the graph structure and semi-supervised classification. In Proceedings of the 27th ACM international conference on information and knowledge management. 87-96.

Liang Yang, Zesheng Kang, Xiaochun Cao, Di Jin, Bo Yang, and Yuanfang Guo. 2019. Topology Optimization based Graph Convolutional Network.. In IJCAI. 4054-4061.

Feng Yu, Qiang Liu, Shu Wu, Liang Wang, and Tieniu Tan. 2016. A dynamic recurrent model for next basket recommendation. In Proceedings of the 39th International ACM SIGIR conference on Research and Development in Information Retrieval. 729-732.

Hengrui Zhang, Qitian Wu, Junchi Yan, David Wipf, and Philip S Yu. 2021. From canonical correlation analysis to self-supervised graph neural networks. Advances in Neural Information Processing Systems 34 (2021).

Tianqi Zhang, Yun Xiong, Jiawei Zhang, Yao Zhang, Yizhu Jiao, and Yangyong Zhu. 2020. CommDGI: Community Detection Oriented Deep Graph Infomax. In Proceedings of the 29th ACM International Conference on Information & Knowledge Management. 1843-1852.

Jianan Zhao, Xiao Wang, Chuan Shi, Binbin Hu, Guojie Song, and Yanfang Ye. 2021. Heterogeneous graph structure learning for graph neural networks. In 35th AAAI Conference on Artificial Intelligence (AAAI).

* cited by examiner

200

210
DETERMINE CO-VIEWING RELATIONSHIPS BETWEEN CATEGORIES

220
DETERMINE CLUSTERS FOR CATEGORIES

230
RECEIVE USER SELECTION OF ANCHOR DOCUMENT

240
PRESENT CATEGORY FROM CLUSTER WITH ANCHOR CATEGORY

400

600

610    RECEIVE SELECTION OF ANCHOR DOCUMENT

620    ACCESS SELECTION HISTORY

630    DETERMINE ANCHOR EMBEDDING FOR SEQUENCE

640    MATCH ANCHOR EMBEDDING TO CLUSTER EMBEDDING

650    PRESENT CATEGORY IN MATCHED CLUSTER

700

710 — DOCUMENT DATA

712 — DOCUMENTS

714 — CO-VIEWING SEQUENCES

716 — CANDIDATE SETS

720 — USER DATA

722 — ANCHOR DOCUMENT

724 — USER CO-VIEWING SEQUENCE

730 — DOCUMENT RECOMMENDATION SYSTEM

732 — TRAINING MODULE

734 — EMBEDDINGS MODULE

736 — RELEVANCE MODULE

130 — SERVER

140 — USER DEVICE

900

910    TRAIN MACHINE LEARNING ALGORITHM

920    RECEIVE SELECTION OF ANCHOR DOCUMENT

930    RETRIEVE USER CO-VIEWING SEQUENCE

940    GENERATE SEQUENCE EMBEDDINGS SET

950    COMPARE GENERATED EMBEDDINGS SET TO CANDIDATE SETS

960    DETERMINE CANDIDATE SET CLOSEST TO GENERATED EMBEDDINGS

970    PRESENT CATEGORY FROM CLOSEST CANDIDATE SET

1000

1010

RETRIEVE DOCUMENT CO-VIEWING SEQUENCE

1020

DERIVE SUBSET FROM THE DOCUMENT CO-VIEWING SEQUENCE

1030

COMPARE SUBSET TO CANDIDATE SETS

1040

DETERMINE AT LEAST ONE CANDIDATE SET RELATED TO SUBSET

1050

ASSOCIATE A RESPECTIVE SUBSEQUENCE OF SUBSET WITH THE AT LEAST ONE CANDIDATE SET

1100

1110 — RECEIVE SELECTION OF ANCHOR DOCUMENT

1120 — RETRIEVE USER SEQUENCE OF INTERACTIONS PRIOR TO ANCHOR DOCUMENT

1130 — GENERATE FIRST EMBEDDINGS SET FOR ANCHOR SET

1140 — GENERATE SECOND EMBEDDINGS SET FOR ANCHOR SEQUENCE

1150 — DETERMINE PREDICTED SET BASED ON FIRST AND SECOND EMBEDDINGS SETS

1160 — PRESENT DOCUMENT OF THE PREDICTED SET

1200

1210 — RETRIEVE DOCUMENT CO-VIEWING SEQUENCE

1220 — GENERATE EMBEDDINGS OF EACH DOCUMENT IN SEQUENCE

1230 — GENERATE SEQUENCE EMBEDDINGS BY AGGREGATING DOCUMENT EMBEDDINGS

1240 — COMPARE SEQUENCE EMBEDDINGS TO CANDIDATE SET EMBEDDINGS

1250 — BASED ON COMPARISON, PRESENT AT LEAST ONE DOCUMENT OF CANDIDATE SET

DOCUMENT RECOMMENDATIONS BASED ON CONTEXT-AWARE EMBEDDINGS

CROSS-REFERENCE TO RELATED APPLICATION

This application claims the benefit of priority to U.S. provisional application No. 63/308,662, filed on Feb. 10, 2022, the entirety of which is hereby incorporated by reference.

TECHNICAL FIELD

This disclosure generally relates to presentation of one or more recommended documents on an electronic interface, the documents recommended based on context-aware embeddings.

BACKGROUND

Existing session-based recommender models are focused on recommending individual items based on user activity. However, in some real-world applications, the goal for recommender models is to recommend sets of entities. For example, it can be helpful to recommend sets of products (e.g., bundles, collections, projects, etc.) in response to a user viewing individual products. In another example, for a music recommendation platform, recommending albums or playlists, as opposed to a discrete song, is desirable.

DETAILED DESCRIPTION

Known recommendation systems do not adequately utilize substantive information about the subjects of user behavior (i.e., documents and their contents or subjects), relying on simple co-purchase data or on human-curated project guides. A novel recommendation system according to the present disclosure may improve upon known systems and methods by clustering document categories and by utilizing data regarding viewing sequences of documents, as well as by providing recommendations based on both the set of documents viewed by a user and on the sequence with which the documents were viewed, which provides context for a particular document, to generate more relevant document recommendations.

Figure 1:
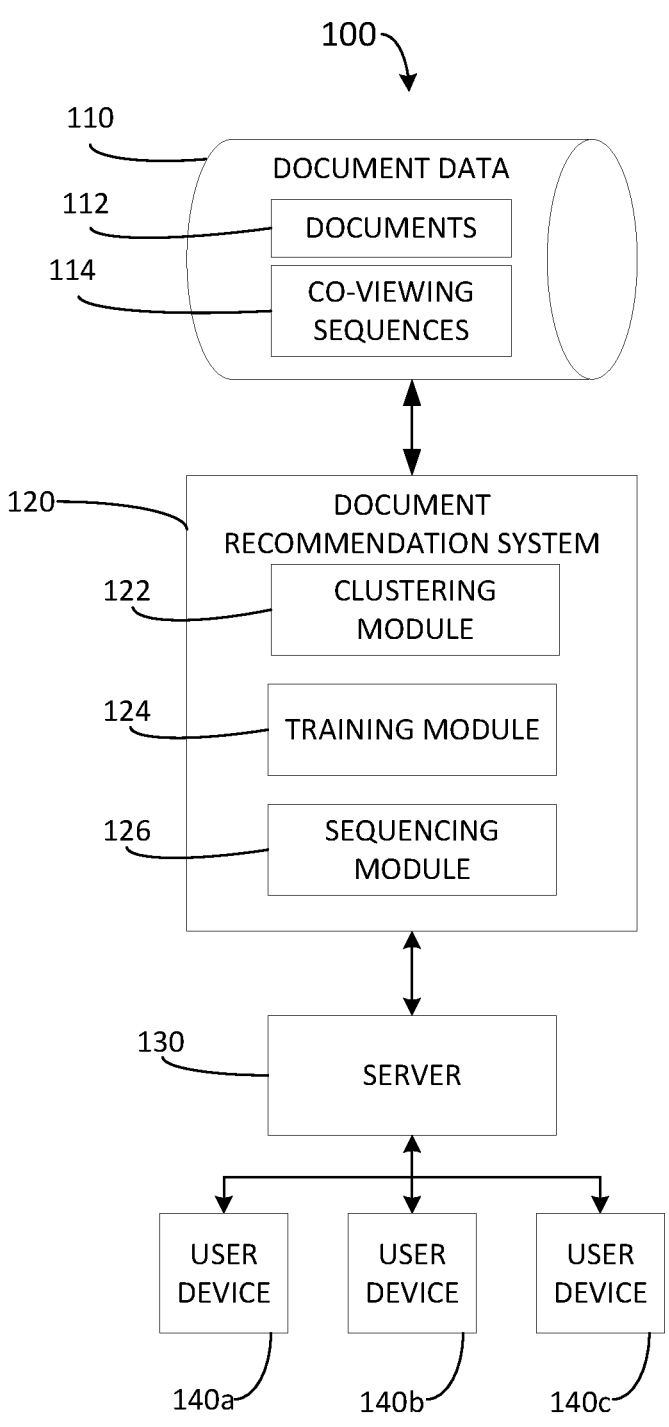
FIG. 1 is a diagrammatic view of an example system for providing a document recommendation to a user based on clusters of document categories.

Referring now to the drawings, wherein like numerals refer to the same or similar features in the various views, FIG. 1 is a diagrammatic view of an example system 100 for providing a document recommendation to a user based on clusters of document categories. The system 100 may include a source of document data 110 and a document recommendation system 120 that may include one or more functional modules 122, 124, and 126 embodied in hardware and/or software. In an embodiment, the functional modules 122, 124, and 126 of the document recommendation system 120 may be embodied in a processor and a memory (i.e., a non-transitory, computer-readable medium) storing instructions that, when executed by the processor, cause the processor to perform the functionality of one or more of the functional modules and/or other functionality of this disclosure.

The document data 110 may include a set of documents 112 and a set of co-viewing sequences 114. In some embodiments, the documents 112 may be documents specific to or otherwise accessible through a particular electronic user interface, such as a website or mobile application. Each document may belong to one or more categories, and the documents 112 may collectively comprise a plurality of categories, with each document in a category being similar to the other documents in the same category. The co-viewing sequences 114 may be orders of actions taken by users on the electronic user interface, such as user navigations to the documents, user selections of the subjects of the documents, user transactions regarding the documents, etc. For example, in some embodiments, the documents 112 may be respective of products and services offered through an e-commerce website (e.g., where each documents is respective of a given product or service), and the co-viewing sequences 114 may be a particular order of user interactions with the documents themselves (e.g., user navigations to, clicks on, or examinations of the documents), and/or user interactions with the products and services that are the subjects of those documents (e.g., purchases, additions to cart, etc.).

In addition to receiving data from the document recommendation system 120, the document recommendation system 120 may update the document data 110. For example, the document recommendation system 120 may transmit newly-received co-viewing sequences to be included within the co-viewing sequences 114, or the document recommendation system 120 may tag the particular sequences in the co-viewing sequences 114 that are used by the document recommendation system 120 (e.g., to train a machine learning algorithm, etc.)

The functional modules 122, 124, and 126 of the document recommendation system 120 may include a clustering module 122 that is configured to receive document data 110 (e.g., documents 112, co-viewing sequences 114), determine categories of documents that are related based on the co-viewing sequences, and cluster those related categories. In some embodiments, the clustering module 122 may include a machine learning algorithm that, once trained, can encode embeddings for each category of documents, which can then be used to determine relatedness.

The functional modules 122, 124, and 126 of the document recommendation system 120 may also include a training module 124 configured to train the machine learning algorithm of the clustering module. The training module 124 may use the co-viewing sequences 114 to train the machine learning algorithm. In some embodiments, the training module 124 may isolate those co-viewing sequences in which a user interacted with the products and services that are the subjects of documents (e.g., additions to cart) as examples of target or desired user activity patterns. Based on the training data examples, the training module 124 may train the machine learning algorithm to predict one or more documents in a co-viewing sequence, and/or the characteristics of such a predicted document.

The functional modules 122, 124, and 126 of the document recommendation system 120 may also include a sequencing module 126 configured to recommend a next category of documents for a user based on the user's particular pattern of activity. The sequencing module 126 may receive a user's sequence of document selections and generate embeddings respective of that sequence (e.g., via the machine learning algorithm discussed in the clustering module 122). The sequencing module may then compare the generated embeddings to a set of cluster embeddings (e.g., embeddings of the category clusters from the clustering module 122), and present, to the user, the category corresponding to the closest-matching cluster embeddings. In some embodiments, the cluster embeddings may be determined offline prior to a user accessing the system 100, such that the cluster embeddings may be provided by a third party or determined separately from the embeddings of user selections.

The system 100 may further include a server 130 in electronic communication with the document recommendation system 120 and with a plurality of user computing devices 140*a*, 140*b*, and 140*c*. The server 130 may provide a website, data for a mobile application, or other interface through which the users of the user computing devices 140 may navigate and otherwise interact with the products associated with document data 110. In some embodiments, the server 130 may receive, in response to a user selection, an indication of a recommended next category of document from the document recommendation system 120, and present one or more documents from the next category to the user (e.g., through the interface).

Figure 2:
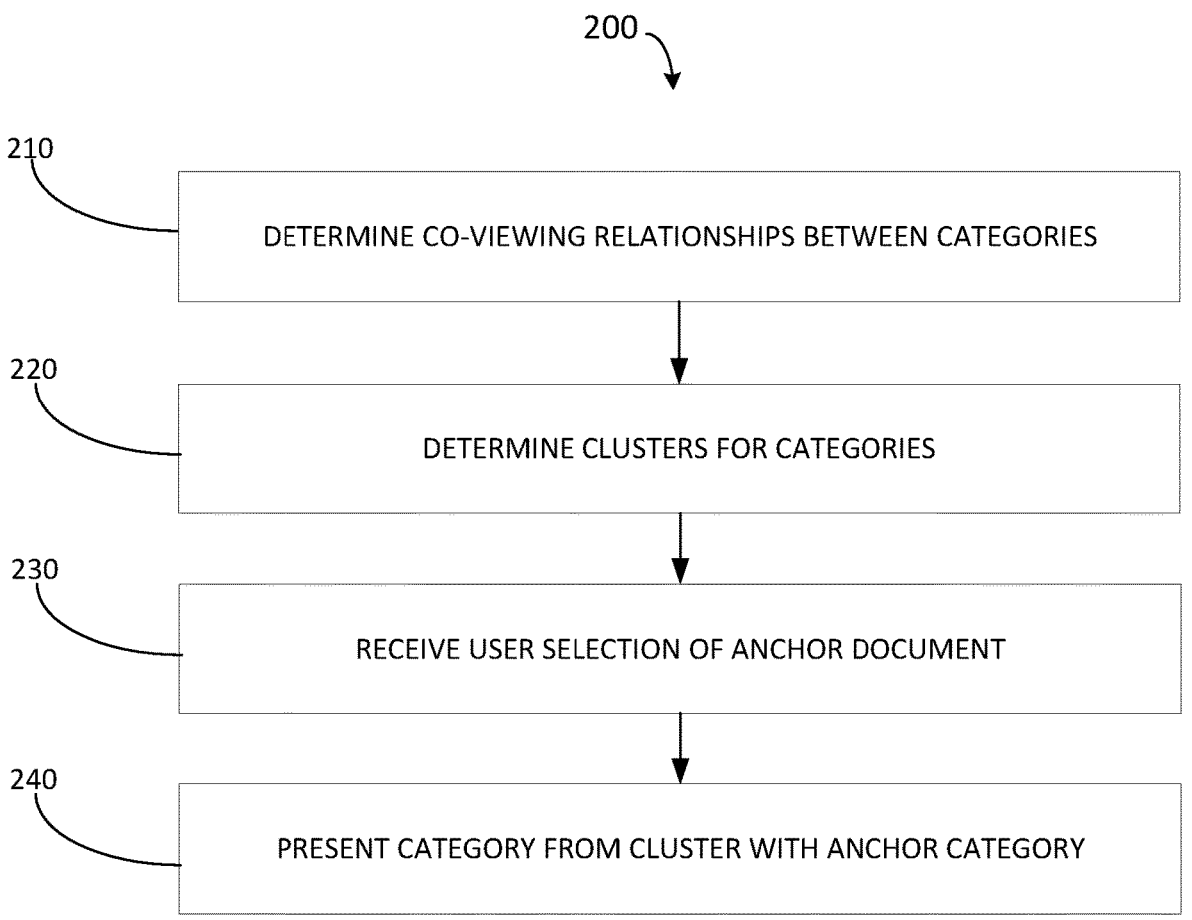
FIG. 2 is a flow chart illustrating an example method of providing a document recommendation to a user based on clusters of document categories.

FIG. 2 is a flow chart illustrating an example method 200 of providing a document recommendation to a user based on clusters of document categories. The method 200, or one or more portions of the method 200, may be performed by the system 100, and more particularly by the document recommendation system 120, in some embodiments.

The method 200 may include, at block 210, determining co-viewing relationships between categories of documents and, at block 220, determining clusters for the categories based on the co-viewing relationships. Details of blocks 210 and 220 can be found in method 300 of FIG. 3. In some embodiments, a relationship between two categories is determined according to equation (1) below:

$$\frac{\#Co\_Purchase(A,\ B)}{Expected\_weight(A,\ B)} \qquad \text{(Eq. 1)}$$

in which A is a first category, B is a second category, #Co_Purchase(A,B) is a number of instances in which A and B are purchased in the same transaction, and Expected_weight(A,B) is determined according to equation (2) below:

$$\frac{Deg(A) * Deg(B)}{2 * Total\_Purchases} \qquad \text{(Eq. 2)}$$

in which Deg(A) is a number of times that A is purchased, Deg(B) is a number of times that B is purchased, and Total_Purchases is a total number of purchases made on the interface.

In other embodiments, co-viewing sequence data (e.g., co-viewing sequences 114) may first be received or accessed to train a machine learning algorithm. From there, embeddings for each category of documents may be determined using the trained machine learning algorithm. Distances between each embeddings vector may then be determined according to a cosine similarity, Euclidean distance, or other appropriate multi-dimensional distance calculation. In some embodiments, the relative distance of each embeddings vector may be determined relative to every other embeddings vector, and pairs of embeddings vectors that are closer to each other than a threshold value may be assigned to a common cluster. In these embodiments, each cluster may comprise embeddings vectors that each are within a threshold distance to every other embeddings vector in the cluster, such that the cluster includes related categories. Each category may be in multiple clusters (e.g., if each cluster is analogous to home improvement project, then a category may be included in multiple clusters if that subject matter of documents in that category would be used in multiple home improvement projects).

The method 200 may further include, at block 230, receiving a user selection of an anchor document. The user selection may be made on the user device 140 and received via the server 130. In some embodiments, the user selection may be a user navigation to the anchor document, and in other embodiments, the user selection may be a selection of the subject of the anchor document or a user transaction regarding the anchor document. The category that includes the anchor document may be referred to as an anchor category.

The method 200 may further include, at block 240, presenting a category of documents that are included in the same cluster as the anchor category. Presenting a category of documents may entail presenting a document that belongs to the category. In those embodiments in which the anchor category belongs to a single cluster, one or more of the other categories from that single cluster may be presented. In those embodiments in which the anchor category belongs to multiple clusters, one or more of the other categories from each of the multiple clusters may be presented.

Figure 3:
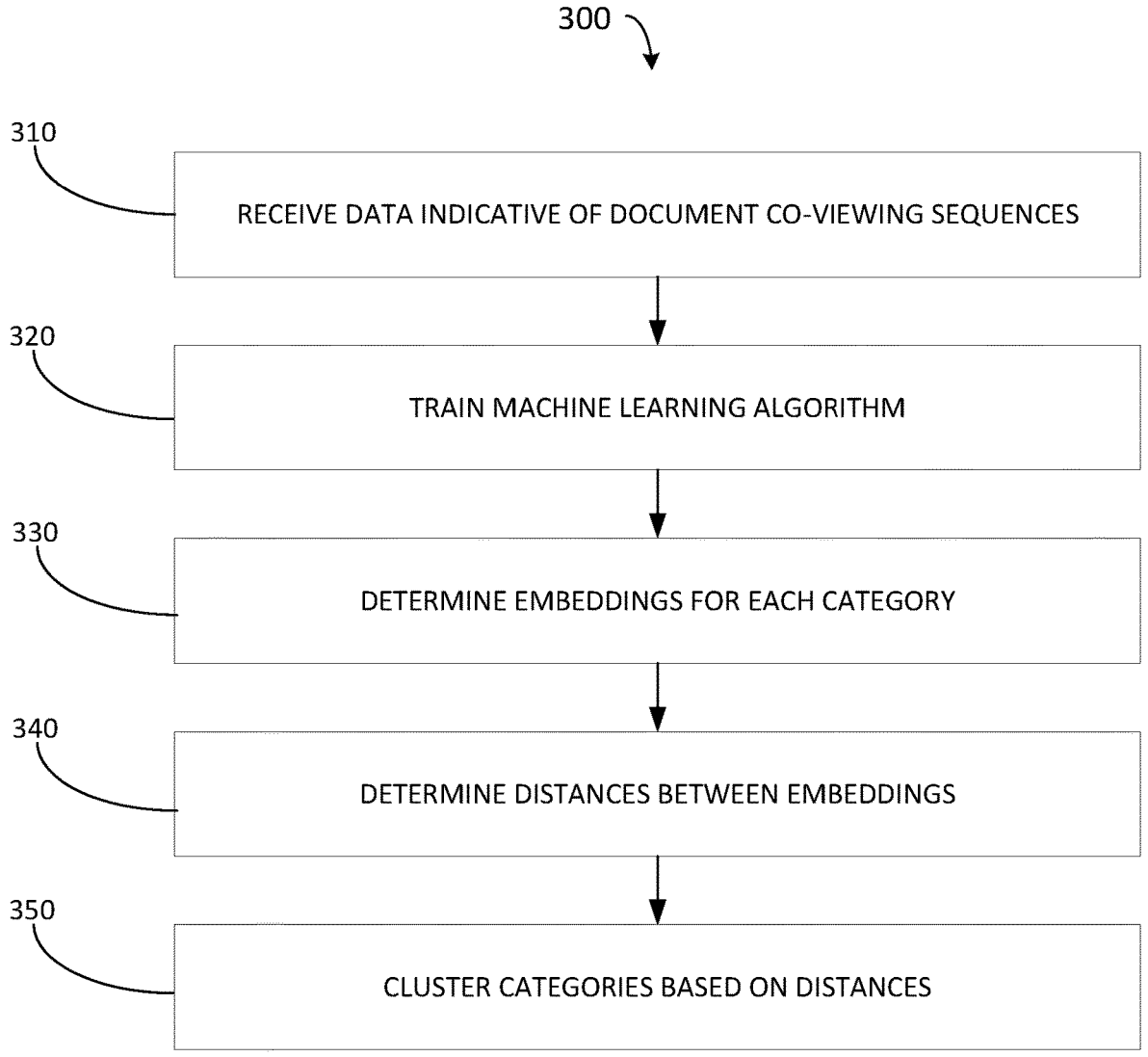
FIG. 3 is a flow chart illustrating an example method of determining clusters of document categories based on document co-viewing sequences.

FIG. 3 is a flow chart illustrating an example method 300 of determining clusters of document categories based on document co-viewing sequences. The method 300, or one or more portions of the method 300, may be performed by the system 100, and more particularly by the clustering module 122 of the document recommendation system 120, in some embodiments.

The method 300 may include, at block 310, receiving data indicative of a user's document co-viewing sequences. These data may be the co-viewing sequences 114, and may include an order of user interactions with documents. The co-viewing sequences 114 may be the order of documents without information regarding the type of interaction (e.g., viewing, transacting, etc.), or the co-viewing sequences 114 include the order of documents with the associated type of interaction. As described with reference to the training module 124, these co-viewing sequences may be used to train a machine learning algorithm.

The method 300 may also include, at block 320, training a machine learning algorithm. Details of block 320 can be found in method 500 of FIG. 5. In some embodiments, the machine learning algorithm may be trained by the co-viewing sequences 114 received in block 310 of the method 300.

The method 300 may also include, at block 330, determining embeddings vectors for each category using the machine learning algorithm trained at block 320, and, at block 340, determining distances between each of the determined embeddings. Because the machine learning algorithm may be trained using co-viewing sequences, the embeddings vector for each category is indicative of each category's position within or relationship to sequences of user activity. The distances may be calculated according to a cosine similarity, Euclidean distance, or other appropriate multi-dimensional distance calculation, and the distances between embeddings vectors are indicative of similarity. As such, a relatively short distance between two embeddings vectors indicates that the two embeddings may often be in shared sequences. In some embodiments, the distances between all pairs of embeddings vectors may be determined, while in other embodiments, the distances between each embeddings vector and other embeddings may be determined until a distance below a threshold value is determined (e.g., distances are determined until a particularly close pair of embeddings is determined).

The method 300 may further include, at block 350, clustering categories based on the determined distances. Pairs of embeddings that are closer to each other than a threshold value may be assigned to a common cluster. In these embodiments, each cluster may comprise embeddings that each are within a threshold distance to every other embeddings vector in the cluster. This threshold value may be pre-determined, or may be based on a silhouette score, such that a threshold value is chosen to maximize the silhouette score. Embeddings may be grouped by selecting an initial embeddings vector and grouping all embeddings that are similar to the initial embeddings vector. This process may then be repeated for all remaining embeddings, with a new initial embeddings selected from the remaining embeddings. Because a category may be in multiple clusters, when a category is assigned to or grouped with a cluster, that category is not removed from a theoretical pool of possible categories for clustering. For example, if category A is within a threshold distance of categories B and C, but category B is not within a threshold distance of category C, clustering category A with category B does not exclude also clustering category A with category B.

In some embodiments, the categories are clustered using a Graph Neural Network (GNN), which plots each category as a node. The nodes may then be connected based on the determined distances between the respective embeddings. In some embodiments, all nodes may be connected to each other, with a line weight for the connection assigned based on the determined distance. In other embodiments, only those nodes with respective embeddings vector distances below a threshold value may be connected, such that each connection is indicative of related or associated categories. Once the nodes and connections are mapped, clusters are determined based on the map. In those embodiments in which all connections are mapped with line weights, a cluster may be comprised of a set of all nodes that are connected to each other with line weights above a threshold value. In those embodiments in which the only connections are between nodes with relatively low respective embeddings differences, a cluster may be comprised of a set of nodes that are each connected to every other node in the set.

Figure 4:
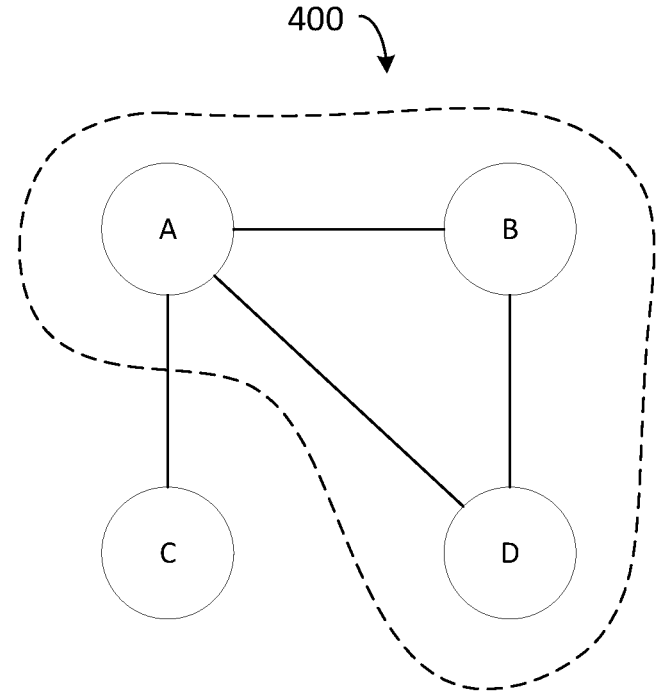
FIG. 4 is an example map of categories nodes plotted and connected according to similarity.

FIG. 4 is an example map 400 of categories nodes plotted and connected according to similarity. As shown in FIG. 4, if Node A is connected to Nodes B, C, and D, Node B is connected to Nodes A and D, Node C is connected to Node A, and Node D is connected to Nodes A and B, then a cluster may be Nodes A, B, and D, as those three nodes are each connected to the other nodes in the cluster.

Figure 5:
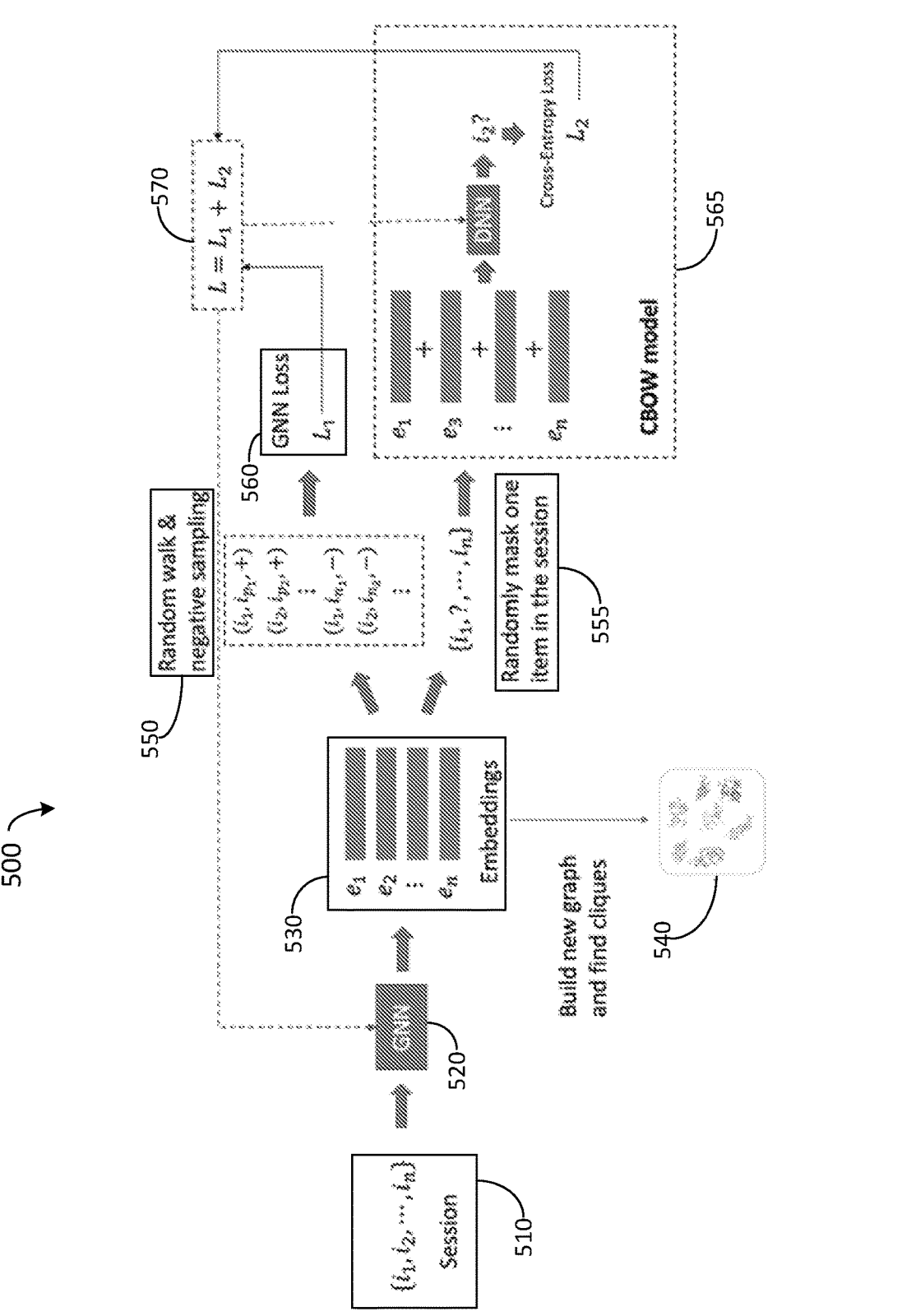
FIG. 5 is a diagrammatic and flow chart view of an example machine learning model and a method of training the machine learning model.

FIG. 5 is a diagrammatic and flow chart view illustrating an example method 500 of training a machine learning algorithm, The method 500, or one or more portions of the method 500, may be performed by the system 100, and more particularly by the training module 124, in some embodiments.

A goal of the method 500 may be to train a GNN to reconstruct a pairwise graph of category relationships and session data, while generating between-category weights that more accurately predict user behavior than equations (1) and (2) above. The method may therefore involve iteratively training the GNN such that a graph produced from the GNN provides improved prediction.

The method 500 may include, at block 510, receiving data regarding one or more (e.g., a plurality of) sessions of user activity. This session data may be a set of co-viewing sequences (e.g., co-viewing sequences 114), such that block 510 may be similar to block 310 of method 300. Each co-viewing sequence may include an order of documents that were viewed by a user during a session with the respective interface. The particular order of documents may be the elements of the sequence, such that each element is a different document (or category of document).

The method 500 may also include, at block 520, inputting the session data into the machine learning algorithm (e.g., a GNN) that generates embeddings vectors as output and, at block 530, generating embeddings vectors with the GNN based on the session data. In some embodiments, a determined embeddings vector may be respective of a session, while in other embodiments, a determined embeddings vector may be respective of a category of documents that was viewed as part of the session data. In these embodiments, the embeddings vector is reflects context provided by the session data.

The method 500 may further include, at block 540, building a graph based on the embeddings vectors. An example graph is shown in FIG. 4. As discussed with reference to FIG. 4, the graph may be built by plotting each category as a node, and connecting the nodes based on a distance between embeddings vectors associated with the respective categories.

The method 500 may include two forms of comparison of the predictions of the GNN. First, at block 550, the method may include performing a random walk and negative sampling in which, at each iteration of training, positive and negative examples of session data are generated, with the negative examples generated at random, and a first loss $L_1$ may be calculated based on the predictive quality of the GNN as to those positive and negative examples at block 560.

Second, the method 500 may further include, at block 555, masking one or more datapoints (e.g., documents in a co-viewing sequence) from the session data received at block 510, and, at block 565, inputting the co-viewing sequences with masked datapoints into a Continuous Bag of Words (CBOW) model to determine a second loss $L_2$, which may be calculated as a cross-entropy loss. In some embodiments, a single session (e.g., a single co-viewing sequence) may be selected from the session data, and a single datapoint may be masked (e.g., temporarily hidden) in the session. Embeddings may be determined for each of the unmasked datapoints, and may be input into a Deep Neural Network (DNN) utilizing the CBOW model. The CBOW model may output an estimate value for the masked datapoint, which may be compared to the actual masked datapoint.

The method 500 may further include, at block 570, determining an overall loss L based on the first and second loss factors, and the GNN may be trained to minimize the loss L.

Figure 6:
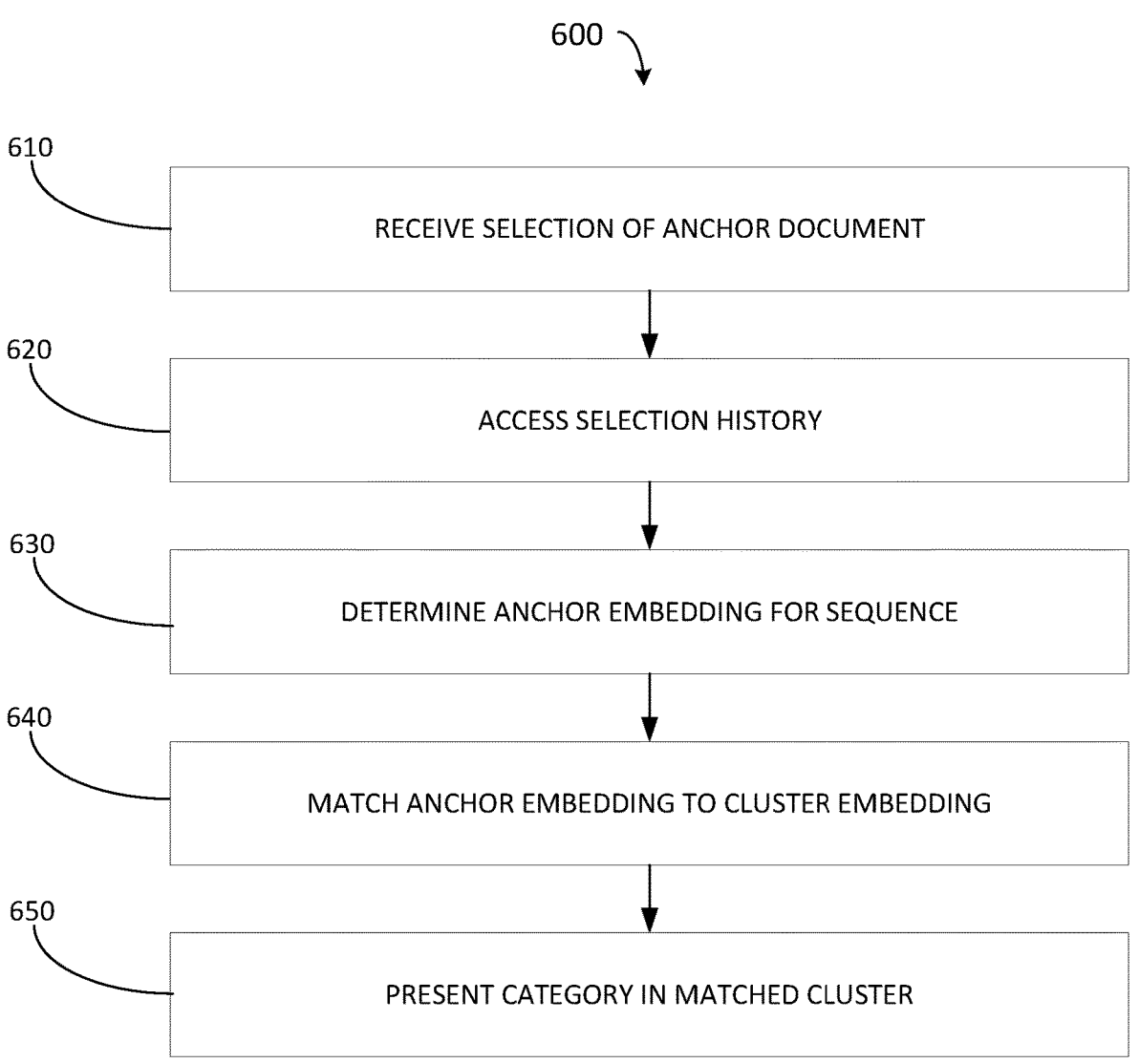
FIG. 6 is a flow chart illustrating an example method of providing a dynamic document recommendation to a user based on a sequence of user activity.

FIG. 6 is a flow chart illustrating an example method 600 of providing a dynamic document recommendation to a user based on a sequence of user activity. The method 600, or one or more portions of the method 600, may be performed by the system 100, and more particularly by the document recommendation system 120, in some embodiments.

The method 600 may include, at block 610, receiving a user selection of an anchor document. Similarly to block 230 of method 200, the user selection may be made on the user device 140 and received via the server 130. In some embodiments, the user selection may be a user navigation to the anchor document, and in other embodiments, the user selection may be a selection of the subject of the anchor document or a user transaction regarding the anchor document. The category that includes the anchor document may be referred to as an anchor category.

The method 600 may also include, at block 620, accessing the user's selection history. The user's selection history may be stored with the co-viewing sequences 114, and may include the user's particular order of interactions with the documents themselves (e.g., user navigations to, clicks on, or examinations of the documents), and/or interactions with the products and services that are the subjects of those documents (e.g., purchases, additions to cart, etc.). The selection history, as used for block 620, may be limited to the selection history of this particular user, and may exclude selection histories (or co-viewing sequences) of other users. In some embodiments, the user's selection history is limited to a current session (e.g., the current period of time in which the user is accessing the interface that began when the user first accessed the interface on the current day), while in other embodiments, the user's selection history may include all sessions in which the user accessed the interface.

The method 600 may further include, at block 630, determining an anchor embeddings vector for the user's sequence. The user's sequence here is selection of the anchor product within context provided by the user's selection history. In some embodiments, the user's sequence may be the order of all documents with which the user interacted (inclusive of the anchor product), while in other embodiments, the user's sequence may be the order of those documents only viewed by the user (inclusive of the anchor product). In further embodiments, the user's sequence may be the anchor product and the order of those documents with whose subjects the user previously transacted. Similarly to block 320 of method 300, the anchor embeddings vector (e.g., the embeddings of the user's sequence based on the anchor product) may be encoded used the trained machine learning algorithm.

The method 600 may further include, at block 640, matching the anchor embeddings vector with at least one embeddings vector of a category cluster. The cluster embeddings may be determined by encoding the clusters that result from block 340 of method 300 using the trained machine learning model. Matching the anchor embeddings vector may involve determining a relative distance (e.g., cosine similarity, Euclidean distance) between the anchor embeddings vector and each cluster embedding. In some embodiments in which only a single matched cluster is desired, the matched cluster may be determined as the cluster with the respective embeddings vector that is the closest to the anchor embeddings vector. In other embodiments in which multiple matched clusters are acceptable, the matched cluster(s) may be those clusters with respective embeddings that are within a threshold distance of the anchor embeddings vector.

The method 600 may further include, at block 650, presenting, to the user, a category from the matched cluster. This presentation may be done similarly to block 240 of method 200, such that presenting a category may entail presenting a document that belongs to the category. In those embodiments in which a single cluster is matched, one or more (or all) of the other categories from that single cluster may be presented. In those embodiments in which multiple clusters are matched, one or more of the other categories from each of the multiple clusters may be presented.

Clustering categories of documents based on clustering according to methods 200, 300, and 600 may provide numerous benefits over existing recommendation methods. First, by utilizing context (e.g., the user's sequence) around a user's selection to inform the recommendation, the system 100 provides a more accurate and relevant recommendation. Second, because the recommendation is revised and refined throughout a user's session by continuously updating the context used to determine the recommendation, the system 100 operates in a more dynamic and responsive manner than existing methods. Third, the system 100 utilizes a trained machine-learning algorithm, the human element is removed from recommendations, in contrast to existing recommendation methods that rely on human-curated lists and guides. Fourth, the recommendations made by the system 100 are at the category-level, which provides a more thorough and accessible recommendation to a user than existing recommendation systems that provide recommendations at the document-level, which restrict users into a single selection. Fifth, by improving and streamlining the users' experiences on the website, the processing strain on the server 130 is reduced, and overall performance of the server 130 (e.g., loading webpages, loading content, processing interactions) is improved. In particular, because document recommendations that are dynamic and based on a user's current session, the recommendation is more tailored to the user and more likely to be relevant. As such, the user is likely to spend less time browsing and searching through the website, reducing their length of stay without losing a sale.

Figure 7:
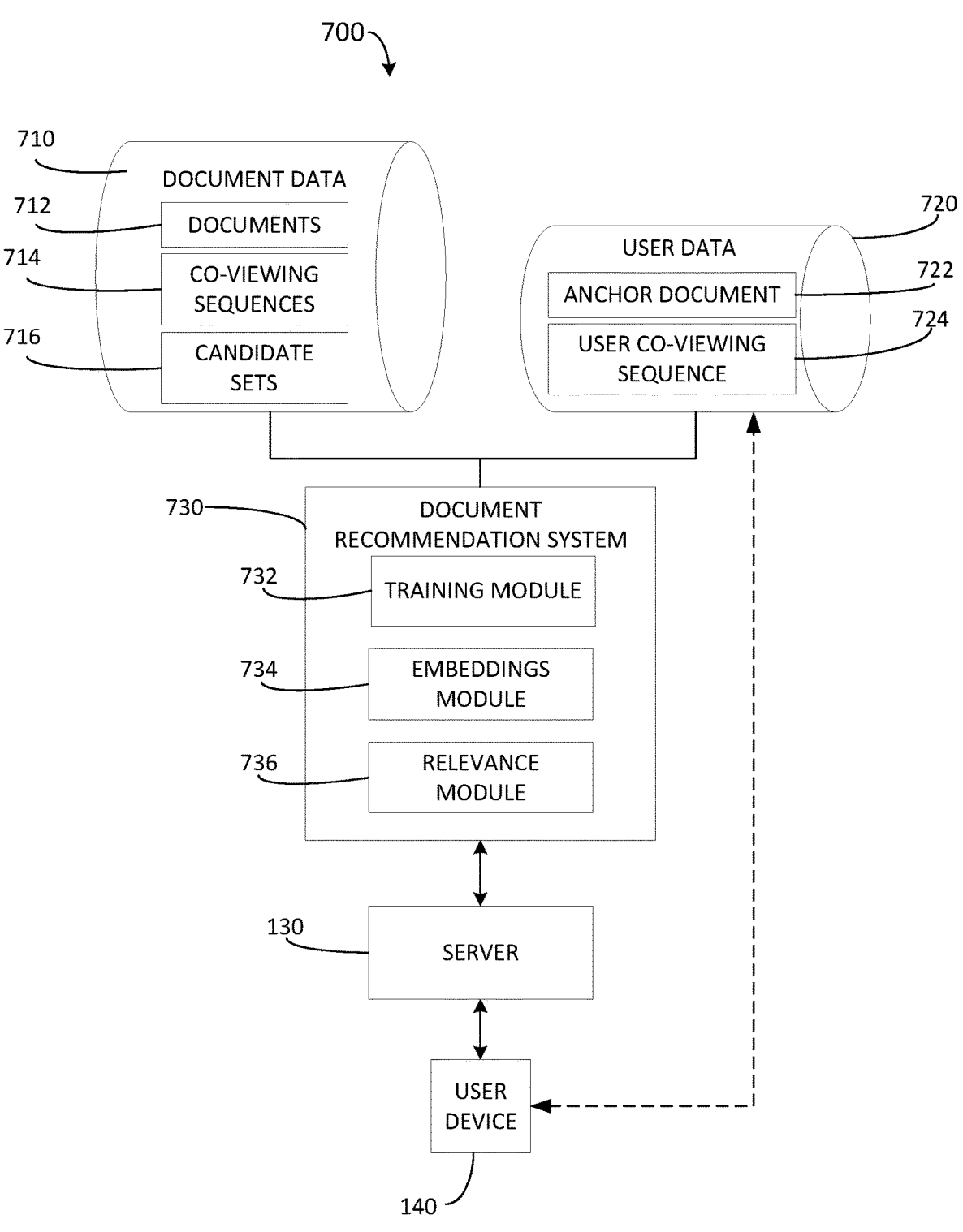
FIG. 7 is a diagrammatic view of an example system for providing a document recommendation to a user based on user activity and stored document data.

FIG. 7 is a diagrammatic view of an example system 700 for providing a document recommendation to a user based on user activity and stored document data. The system 700 may include a source of document data 710, a source of user data 720, and a document recommendation system 730 that may include one or more functional modules 732, 734, and 736 embodied in hardware and/or software. In an embodiment, the functional modules 732, 734, and 736 of the document recommendation system 730 may be embodied in a processor and a memory (i.e., a non-transitory, computer-readable medium) storing instructions that, when executed by the processor, cause the processor to perform the functionality of one or more of the functional modules and/or other functionality of this disclosure.

The document data 710 may include a set of documents 712, a set of co-viewing sequences 714, and candidate set 716. In some embodiments, the documents 712 may be documents specific to or otherwise accessible through a particular electronic user interface, such as a website or mobile application. Each document may belong to one or more categories, and the documents 712 may collectively comprise a plurality of categories, with each document in a category being similar to the other documents in the same category. The co-viewing sequences 714 may be orders of actions taken by users on the electronic user interface, such as user navigations to the documents, user selections of the subjects of the documents, user transactions regarding the documents, etc. For example, in some embodiments, the documents 712 may be respective of products and services offered through an e-commerce website (e.g., where each documents is respective of a given product or service), and the co-viewing sequences 714 may be a particular order of user interactions with the documents themselves (e.g., user navigations to, clicks on, or examinations of the documents), and/or user interactions with the products and services that are the subjects of those documents (e.g., purchases, additions to cart, etc.). The candidate sets 716 may be clusters of documents or document categories that are associated with each other and/or are often co-viewed in a single session. In some embodiments, the candidate sets 716 may be generated by the document recommendation system 120.

In addition to receiving data from the document data 110, the document recommendation system 730 may update the document data 710. For example, the document recommendation system 730 may cause (e.g., transmit for storage) newly-received co-viewing sequences to be stored within the co-viewing sequences 714, or the document recommendation system 730 may tag the particular sequences in the co-viewing sequences 714 that are used by the document recommendation system 730 (e.g., to train a machine learning algorithm, etc.)

The user data 720 may include an anchor document 722 and a user co-viewing sequence 724. The anchor document 722 may be a document (or documents) selected by a user from the set of documents 712, such that the anchor document may similarly be a document specific to or otherwise accessible through a particular electronic user interface, such as a website or mobile application. The selection of the anchor document 722 may be received from a user device 140. The user co-viewing sequence 724, similarly to the co-viewing sequences 714, may be an order of actions taken by a user on the electronic user interface (e.g., via the user device 140), such as user navigations to the documents, user selections of the subjects of the documents, user transactions regarding the documents, etc. For example, the anchor document 722 may be a document selected by the user, and the user co-viewing sequence 724 may be an order or sequence of documents the user navigated to or interacted with prior to selecting the anchor document 722.

The functional modules 732, 734, and 736 of the document recommendation system 730 may include a training module 732 that is configured to receive document data 710

(e.g., documents 712, co-viewing sequences 714), to determine (e.g., derive or compile) training data from the document data 710, and to train a machine learning algorithm that, once trained, can encode embeddings for each category of documents, which can then be used to determine relatedness of a document (or set of documents) to another document (or set of documents). In particular, the training module 734 may split a single co-viewing sequence into a subset and a subsequence, and may determine one or more candidate sets 716 that are similar to the subset. The subset may be the first X number of documents in the co-viewing sequence, or the subset may be the first X % of documents in the co-viewing sequence, such that the subset may include some (but not all) of the elements in the co-viewing sequence, with the remaining (e.g., not-included) elements used to generate a subsequence. In contrast to the subset, the subsequence may be generated with sequential coding based on the original co-viewing sequence in order to maintain the same order of elements in the sub-sequence as in the co-viewing sequence. The training module 734 may associate each of those one or more similar candidate sets 716 to the subsequence.

In some embodiments, the training module 734 may utilize both positive sampling and negative sampling to train the model. Positive sampling may include positively associating the subset with a candidate set similar to the respective subsequence. Negative sampling may include first adding noise to the respective subsequence, and then negatively associating the subset with a candidate set similar to the noise-altered subsequence.

The functional modules 732, 734, and 736 of the document recommendation system 730 may also include an embeddings module 734 configured to utilize the trained machine learning algorithm to encode embeddings based on the user data 720 (e.g., anchor document 722, user co-viewing sequence 724). The embeddings module 734 may treat the anchor document 722 and the user co-viewing sequence 724 as a single anchor sequence, in which each document from the anchor document 722 and the user co-viewing sequence 724 may be ordered in the anchor sequence based on the order in the user co-viewing sequence 724. The embeddings module 734 may also treat the anchor document 722 and the user co-viewing sequence 724 as a single anchor set, in which each document of the anchor document 722 and the user co-viewing sequence 724 may be combined in a set, regardless of order.

The embeddings module 734 may separately encode embeddings sets for the anchor sequence and the candidate sets 716 to which the anchor sequence may be compared. The embeddings set for the anchor sequence may include embeddings encoded for each element (e.g., document) in the anchor sequence based, in part, on the order of elements in the anchor sequence, as well as on the content of the other elements in the anchor sequence. The embeddings set for the anchor sequence may be input into a multi-layer attention model that aggregates the embeddings of each element into a single anchor embeddings set by applying an attention value based on the embeddings set for the candidate set 716. By utilizing the separate embeddings sets and the multi-layer attention model to generate the anchor embeddings set within the context of the candidate set 716, the embeddings module 734 applies a context-aware aggregation model that results in an embeddings set in which the representation of an input sequence accounts for the context of each document within the sequence.

Similarly, the embeddings module 734 may generate embeddings for each of the candidate sets 716. In some embodiments, these embeddings may be context-aware, such that the embeddings for each element in the candidate set 716 may be encoded based on content of other elements in the same candidate set 716. In some embodiments, which are described in greater depth with reference to FIG. 8, the generated embeddings set for the candidate set 716 may be input into a multi-layer attention model that aggregates the embeddings of each element into an ultimate candidate set embeddings set by applying an attention value based on the embeddings set for the anchor sequence being encoded in parallel. As such, the ultimate candidate set 716 embeddings set may be encoded within the context of the other elements of the candidate set 716 as well as of the anchor sequence to which the candidate set 716 may be compared for relevancy.

The functional modules 732, 734, and 736 of the document recommendation system 730 may also include a relevance module 736 configured to recommend a document or category of documents for a user based on the user's particular pattern of activity (e.g., the anchor document 722 and user co-viewing sequence 724). The relevance module 736 may receive the anchor embeddings set from the embeddings module 734, and may compare the anchor embeddings set to embeddings generated (e.g., by the embeddings module 734 using the trained machine learning algorithm, as described above) for each of the candidate sets 716. Based on the comparison, the relevance module 736 may present one or more documents (or document categories) from the candidate set most associated (e.g., having a closest embeddings) with the anchor embeddings set.

The system 700 may further include the server 130 in electronic communication with the document recommendation system 730 and the user computing device 140. The server 130 may provide a website, data for a mobile application, or other interface through which the user of the user computing device 140 may navigate and otherwise interact with the products associated with document data 710 (e.g., to select the anchor document 722, etc.). In some embodiments, the server 130 may receive, in response to a user selection, an indication of a recommended next category of document from the document recommendation system 730, and present one or more documents from the next category to the user (e.g., through the interface).

Figure 8:
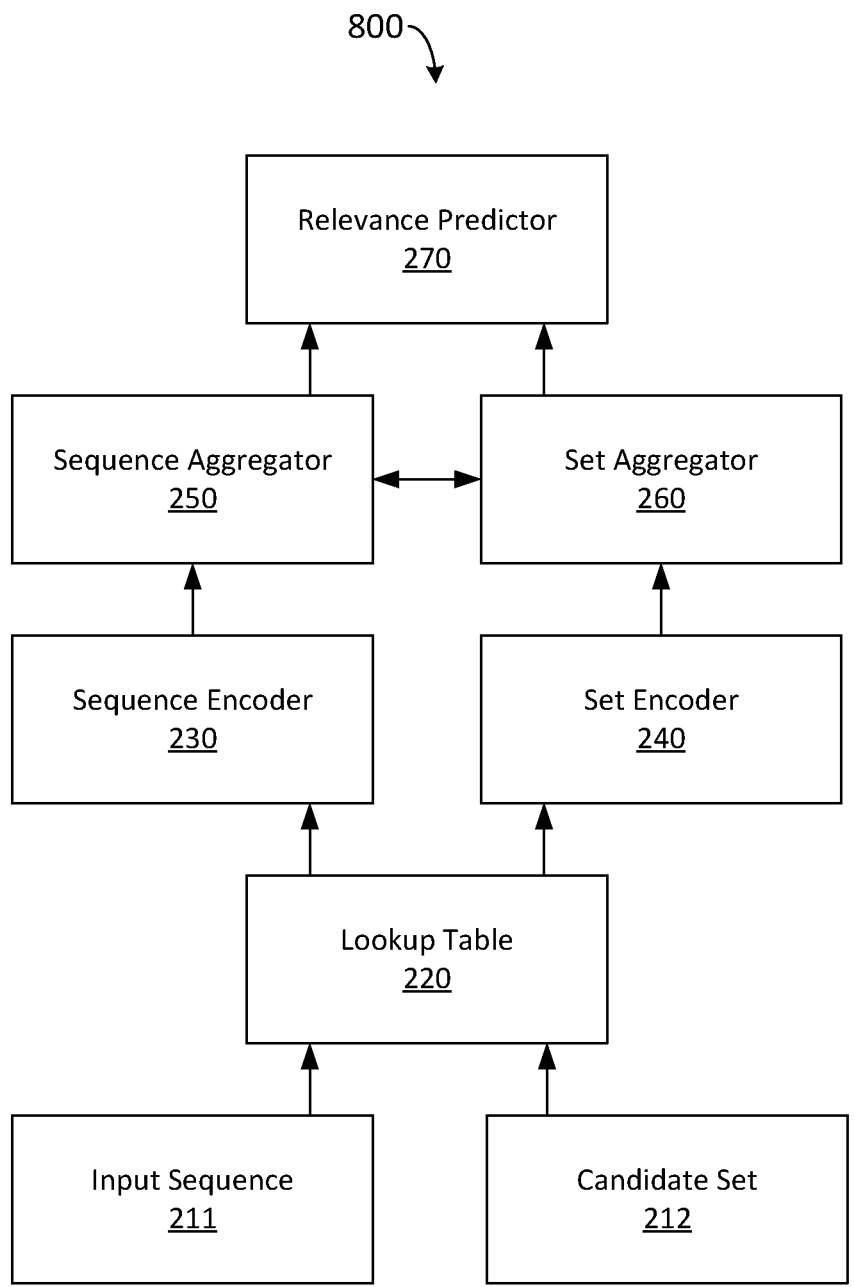
FIG. 8 is a block diagram illustrating an example architecture of a machine learning model for providing a document set recommendation based on user activity.

FIG. 8 is a block diagram illustrating an example architecture of a machine learning model 800 for providing a document set recommendation based on user activity. The model 800 may include or may subsume the embeddings module 734 and/or the relevance module 736, in some embodiments. Accordingly, the model 800, or one or more portions of the model 800, may be implemented by the document recommendation system 730, in some embodiments.

The model 800 may include, at blocks 811 and 812, the receipt of an input sequence 811 and a candidate set 812. The input sequence 811 may include the anchor document 722 and user co-viewing sequence 724, with the input sequence 811 being coded in the order of the anchor document 722 and user co-viewing sequence 724. The candidate set 812 may include a candidate set of documents (e.g., candidate set 716, documents from a candidate category, etc.), which candidate documents may have some or no overlap with the anchor document 722 and/or co-viewing sequence 724.

The model 800 may also include a lookup table 820. The lookup table 820 may be used for retrieving category embeddings for each of the input sequence 811 and the candidate set 812. These category embeddings may be pre-determined and stored in the lookup table 820, and may be assigned to the input sequence 811 and the candidate set

812 based on a category of each element in the respective sequence/set. For example, given an input sequence $T_i$, a candidate set $C_j$, and a lookup function for category embeddings $E \in \mathbb{R}^{d \times |V|}$, where d is the latent dimensionality, each element in the input sequence 811 may be given as $$E^{T_i} = \left[ e_0^{T_i}, \ldots, e_{|T_i|}^{T_i} \right]$$

and, each element in the input set 812 may be given as $$E^{C_i} = \left[ e_0^{C_i}, \ldots, e_{|C_i|}^{C_i} \right],$$

where $$e_0^{T_i} \in R^d$$

may be the one-hot embedding of $$v_0^{T_i},$$

and where $$e_0^{C_j} \in R^d$$

may be the one-hot embedding of $$v_0^{C_j}.$$

To maintain the sequential pattern of the input sequence 811, positional encoding may be added to $E^{T_i}$. In some embodiments, a single lookup table may be shared for both the sequence encoder (e.g., sequence encoder 830) and the set encoder (e.g., set encoder 840) because both the input sequence 811 and the candidate set 812 may have elements from the same pool of documents.

The model 800 may further include a sequence encoder 830 for generating an embeddings vector based on the category embeddings from lookup table 820 associated with the input sequence 811. The sequence encoder 830 may be a transformer encoder configured to determine the embeddings of the input sequence 811 with respect to other elements in the input sequence 811, which may include the added positional encoding. The output of the sequence encoder 830 may be given as $$H^{T_i} = \left[ h_0^{T_i}, \ldots, h_{|T_i|}^{T_i} \right],$$

with $$h_0^{T_i} \in R^d$$

as the context-aware embedding of $$v_0^{T_i},$$

in some embodiments.

The model 800 may also include a set encoder 840 for generating an embeddings vector based on the category embeddings from lookup table 820 associated with the candidate set 812. The sequence encoder 830 may be a transformer encoder configured to obtain the embeddings of the candidate set 812 with respect to other elements in the candidate set 812, without any positional encoding. The output of the set encoder 840 may be given as $$H^{C_j} = [h_0^{C_i}, \ldots, h_{|C_i|}^{C_i}],$$

with $$h_0^{C_j} \in R^d$$

as the context-aware embedding of $$v_0^{C_j},$$

in some embodiments. The sequence encoder 830 and set encoder 840 may operate in parallel, in some embodiments.

The model 800 may include a set aggregator 860 for generating attention-weighted embeddings of the encoded candidate set 812. In some embodiments, the sequence aggregator 850 may be configured as a multi-layer Interactive Attention-based Pooling (IAP) Model.

The model 800 may include a sequence aggregator 850 for generating attention-weighted embeddings of the encoded input sequence 811. In some embodiments, the set aggregator 860 may be configured as a multi-layer IAP Model.

Because the context of the input sequence 811 may inform the embeddings of the input set 812 (and vice versa), the sequence aggregator 850 and the set aggregator 860 may be in communication. For example, the output from one layer of the sequence aggregator 850 may be the input for one layer of the set aggregator 860. For example, if the output for a layer l of the sequence aggregator 850 is denoted as $$p_l^{T_i},$$

the input to layer l may be the output of the sequence encoder 830 (e.g., $H^{T_i}$) and the output of layer l−1 of the set aggregator $$860 \left( e.g., p_{l-1}^{C_j} \right).$$

Similarly, if the output for a layer l of the set aggregator 860 is denoted as $$p_l^{C_j},$$

the input to layer l may be the output of the set encoder 840 (e.g., $H^{C_j}$) and the output of layer l−1 of the sequence aggregator $$860 \left( e.g., p_{l-1}^{C_j} \right).$$

For the first layer of each aggregator 850, 860, because there is no l−1 layer, the input may be defined as the mean pool of the other or opposite (e.g., set for sequence, sequence for set, etc.) element embeddings. In particular, the first layer for the set aggregator 860 may be the mean pool of the sequence embeddings given as $$p_0^{T_i} = \frac{1}{|T_i|} \sum_{k=0}^{|T_i|} h_i^{T_i},$$

and the first layer for the sequence aggregator 850 may be the mean pool of the set embeddings given as $$p_0^{C_j} = \frac{1}{|C_j|} \sum_{k=0}^{|C_j|} h_i^{C_j}.$$

The output of each of the multi-layer IAP models $$\left( e.g., p_l^{T_i} \text{ and } p_l^{C_j} \right).$$

may then be weighted using an attention function that may determine an attention value for each.

In some embodiments, the sequence aggregator 850 and the set aggregator 860 may each include an attention mechanism defined as $$\text{Attention}(Q, K, V) = \text{softmax}\left( \frac{QK^T}{\sqrt{d_k}} V \right),$$

where Q may be the query, K may represent the key vector, and V may represent the value vector. This attention mechanism may define $$p_l^{T_i}$$

as MultiHead(Q,K,V), which may in turn be defined as Concat(head$_1$, head$_2$, . . . , head$_h$)$W^O$, where $$\text{head}_i = \text{Attention}\left( QW_i^Q, KW_i^K, VW_i^V \right), h$$

may be the number of heads, $$W_i^Q \in \mathbb{R}^{d*d_q}, W_i^K \in \mathbb{R}^{d*d_k}, W_i^V \in \mathbb{R}^{d*d_v}, \text{ and } W_i^Q \in \mathbb{R}^{hd_v*d}.$$

The model 800 may further include a relevance predictor 870 for determining a predicted relevance of the candidate set 812 to the input sequence 811. The relevance predictor 870 may receive the attention-weighted outputs for the input sequence 811 ($h^{T_i}$) from the sequence aggregator 850 and for the candidate set 812 ($h^{C_j}$) from the set aggregator 860, and may concatenate the outputs in order to utilize a multi-layer perceptron (MLP). From there, the relevance predictor 870 may utilize a suitable relevance function (e.g., Sigmoid) on the MLP output to determine a predicted degree of relevance between the input sequence 811 and the input set 812. For example, the function may be given as $y_{T_i,C_j}=$Sigmoid(MLP $(h^{T_i}\|h^{C_j})$, where $y_{T_i,C_j}$ may be the relevance score (e.g., how similar the candidate set 812 is to the input sequence 811), and $\|$ may represent the concatenation function performed by the sequence aggregator and the set aggregator 860.

The model 800 may be repeated for multiple candidate sets 812 with the same input sequence 811, such that the relevance score (e.g., the output of the relevance predictor 870) may be compared for multiple candidate sets 812 in order to find the candidate set(s) 812 most relevant (e.g., most similar to) the input sequence 811 at-issue. In some embodiments, the model 800 may be repeated for a predetermined number of candidate sets 812 (e.g., 10 candidate sets). In some embodiments, the model 800 may be repeated until a candidate set 812 returns a relevance score above a threshold value (e.g., the candidate set 812 is sufficiently similar). In some embodiments, the model 800 may be repeated for a group of candidate sets 812 initially determined (e.g., triaged) as possibly relevant based on candidate categories. For example, if the input sequence 811 includes documents belonging to a particular category of documents, the model 800 may only process candidate sets 812 associated with that particular category.

Figure 9:
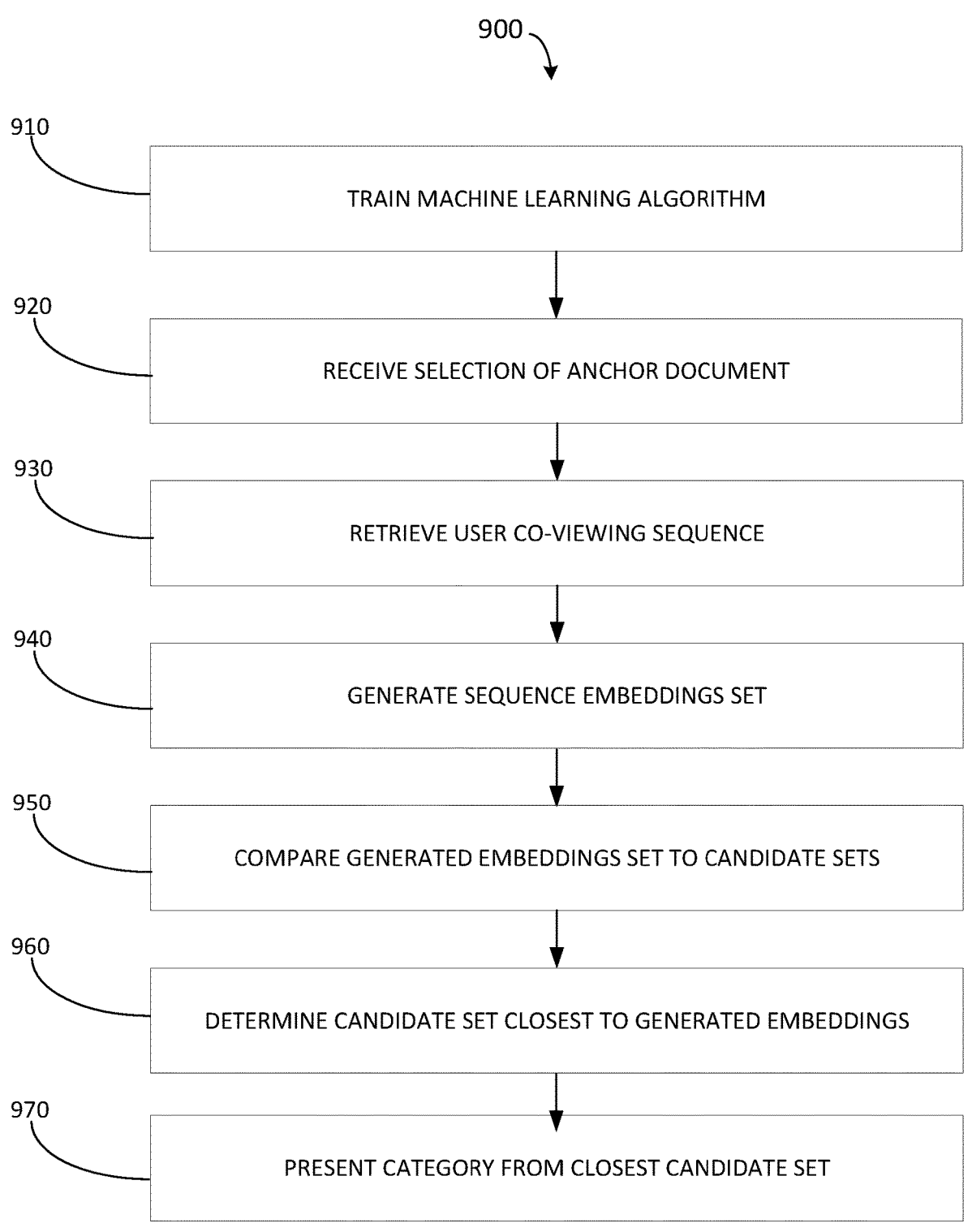
FIG. 9 is a flow chart illustrating an example method of providing a document recommendation to a user based on user activity.

FIG. 9 is a flow chart illustrating an example method 900 of providing document category recommendations to a user based on an anchor product and sequence of user activity. The method 900, or one or more portions of the method 900, may be performed by the system 700, and more particularly by the document recommendation system 730, in some embodiments.

The method 900 may include, at block 910, training a machine learning algorithm. As discussed above with reference to the training module 732, training the machine learning algorithm may include deriving training data from stored data regarding previous user activity (e.g., document data 710). The training process is described in further detail in FIG. 9.

The method 900 may also include, at block 920, receiving selection of an anchor document from a user. As discussed above with reference to the anchor document 722, the selection of the anchor document may be a selection of a document or category of document made by the user via an electronic interface on the user device (e.g., user device 140), received by the server 740, and communicated to the document recommendation system 730. The method may further include, at block 930, retrieving a user co-viewing sequence. As discussed above with reference to the user co-viewing sequence 724, the co-viewing sequence may be an order of actions taken by a user on the electronic user interface prior to the selection of the anchor document. The user co-viewing sequence may be retrieved from a database (e.g., user data 720) connected to the document recommendation system 730.

The method 900 may also include, at block 940, generating a sequence embeddings set based on the anchor document and the user co-viewing sequence. As discussed above with regard to the embeddings module 734, the sequence embeddings set may be generated using the trained machine learning algorithm from block 910. In some embodiments, the sequence embeddings may be generated by encoding the combination of anchor document and user co-viewing sequence as a sequence (e.g., the input sequence 811) in parallel with a candidate set (e.g., the candidate set 812) to which the anchor document and user co-viewing sequence may be compared. As such, each element (e.g., document) of the combination may be encoded as part of a sequence (e.g., via the sequence encoder 830) and with relation to the candidate set (e.g., via the sequence aggregator 850), in parallel with the candidate set being encoded as part of a set (e.g., via the set encoder 840) and with relation to the input sequence (e.g., via the set aggregator 860). The sequence embeddings set may be generated by inputting the document embeddings encoded as part of a sequence into a multi-layer attention model that concatenates and aggregates the sequence embeddings with the candidate set embeddings encoded as part of a set. By generating the embeddings set in this two-step manner, two types of context may be considered for each element in the user input sequence: 1) the other elements within the sequence; and 2) the elements in the candidate set. Basing the attention value on the document embeddings encoded as part of the set may enable the multi-layer attention model to set how much each element may contribute to the sequence embeddings set based on the set.

The method 900 may further include, at block 950, comparing the generated sequence embeddings set to candidate sets of documents (or document categories). As discussed above with regard to the candidate sets 716, the candidate sets may be clusters of documents or document categories that are associated with each other and/or are often co-viewed in a single session. These candidate sets may be pre-set and stored in memory, or may be dynamically determined based on document data 710 (e.g., via the document recommendation system 120). In some embodiments, an embeddings vector may be generated for each candidate set using the trained machine learning algorithm. In these embodiments, comparing the candidate sets to the sequence embeddings set means determining a relevance between each candidate set embeddings and the sequence embeddings set.

The method 900 may also include, at block 960, determining which candidate set (or candidate sets) is closest to the sequence embeddings set. The most-relevant candidate set (e.g., candidate set with a highest relevance) may be determined as the candidate set with a respective embeddings with the greatest relevance to the sequence embeddings set. In some embodiments, a single candidate set is determined as the most relevant, and in other embodiments, all candidate sets within a threshold relevancy from the sequence embeddings set are determined as the most relevant.

The method 900 may further include, at block 970, presenting, to the user, a category from the closest candidate set. Presenting a category may entail presenting a document that belongs to the category. In those embodiments in which a single candidate set is most relevant, one or more of the other categories from that single candidate set may be presented. In those embodiments in which multiple candidate sets are matched, one or more categories from each of the multiple candidate sets may be presented. In some embodiments, all categories in the candidate set may be presented, while in other embodiments, all categories in the candidate set except for the category to which the anchor document belongs are presented.

Figure 10:
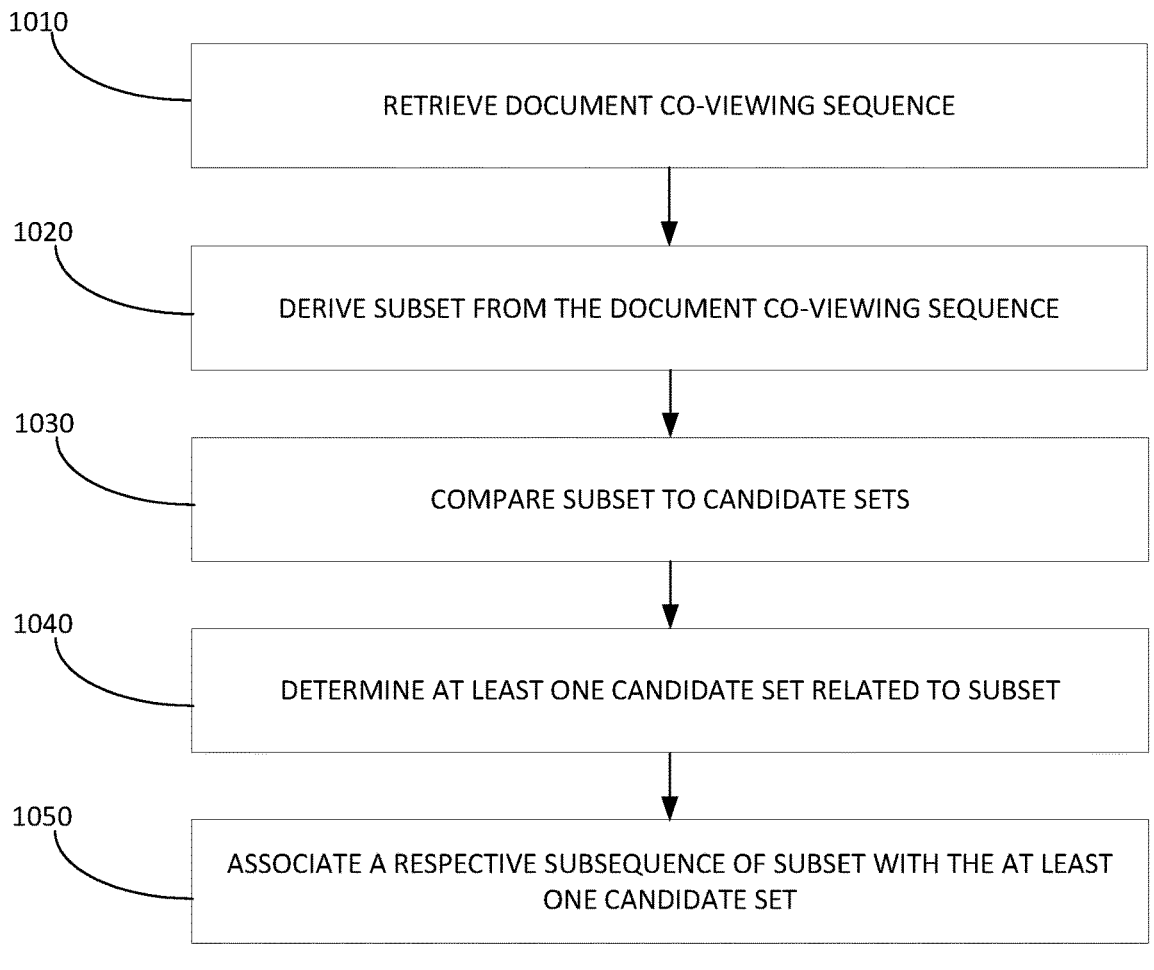
FIG. 10 is a flow chart illustrating an example method of training a machine learning algorithm to generate context-aware embeddings for document sets.

FIG. 10 is a flow chart illustrating an example method 1000 of training a machine learning algorithm to generate context-aware embeddings for document sets. The method 1000, or one or more portions of the method 1000, may be performed by the system 700, and more particularly by the training module 732, in some embodiments.

The method 1000 may include, at block 1010, retrieving a document co-viewing sequence from a stored database (e.g., co-viewing sequences 714 in the document data 710). As discussed above with regard to the co-viewing sequences 714, each document co-viewing sequence may be an order of actions taken by a user on the electronic user interface, such as user navigations to the documents, user selections of the subjects of the documents, user transactions regarding the documents, etc. The method 1000 may also include, at block 1020, deriving a subset of documents from the retrieved document co-viewing sequence. In some embodiments, the derived subset may be the first X number of documents in the co-viewing sequence. In some embodiments, the derived subset may be the first X % of documents in the co-viewing sequence. In further embodiments, two subsets of documents may be derived from the retrieved document co-viewing sequence, with the first subset being treated similarly to the single derived subset in the other embodiments (e.g., for positive training), and with the second subset being utilized to generate a negative set for negative training.

The method 1000 may also include, at block 1030, comparing the derived subset (or the first of two derived subsets) to stored candidate sets, and, at block 1040, determining at least one candidate set related to the derived subset. The comparison of the subset and candidate sets may be based on a comparison of each element in the subset to each element of each candidate set. The related candidate set may be the candidate set having the highest number of intersection (e.g., overlap) with the subset. In some embodiments, all candidate sets with an amount of intersection above a threshold may be determined as related to the subset.

The method 1000 may further include, at block 1050, associating a respective subsequence with the related candidate set(s). The respective subsequence may be the elements of the co-viewing sequence that are not included in the derived subset, such that the subsequence may be directly related to the subset. By associating the subsequence with the candidate set(s) determined to be related to the derived subset, the machine learning model may be trained to associate that particular subset with the subsequence. Blocks 1010-1050 may be repeated as desired.

In some embodiments, noise may be introduced to the respective subsequence prior to associating the respective subsequence with the related candidate set(s). In some of these embodiments, the noise may be introduced to the second of the two derived subsets at block 1020. In these embodiments, the respective subsequence is negatively associated with the related candidate set(s) to provide set-based negative sampling. Noise may be added by replacing a number of documents (or categories of documents) in the subsequence with an equal number of different documents (or categories of documents), by adding a number of documents not already in the subsequence, and/or by removing a number of documents in the set without replacing the removed documents. The amount of noise (e.g., number of documents replaced, added, or removed) may be based on an accuracy of the machine-learning algorithm, with more noise being added to a less accurate model to more drastically train the algorithm at early stages of training.

Figure 11:
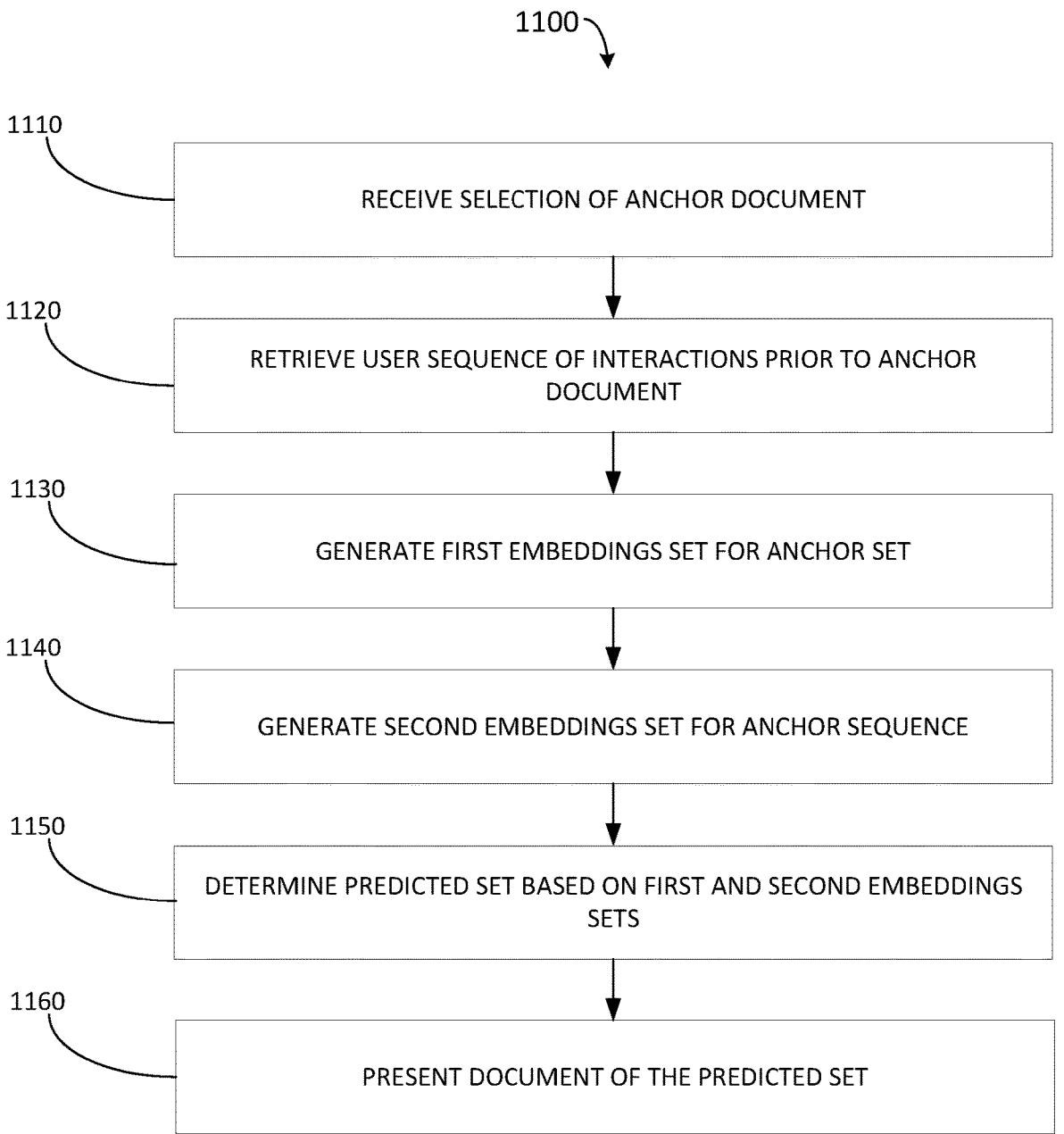
FIG. 11 is a flow chart illustrating an example method of providing document category recommendations to a user based on an anchor product and sequence of user activity.

FIG. 11 is a flow chart illustrating an example method 1100 of providing document category recommendations to a user based on an anchor product and sequence of user activity. The method 1100, or one or more portions of the method 1100, may be performed by the system 700, and more particularly by the document recommendation system 730, in some embodiments.

The method 1100 includes, at block 1110, receiving selection of an anchor document. Similar to block 920 of method 900, the selection of the anchor document may be a selection of a document or category of document made by the user via an electronic interface on the user device (e.g., user device 140), received by the server 130, and communicated to the document recommendation system 730. The method may further include, at block 1120, retrieving a user sequence of interactions prior to the selection of the anchor document. The sequence of interactions may be the user co-viewing sequence 724, which may be retrieved from a database (e.g., user data 720) connected to the document recommendation system 730.

The method 1100 may also include, at block 1130, generating a first embeddings set for an anchor sequence. The elements of the anchor sequence may be the anchor document and each document in the retrieved user sequence, with positional encoding based on the documents' order in the retrieved user sequence. The first embeddings set may be generated by a trained machine learning algorithm (e.g., from the training module 732), which may include a transformer encoder denoted as a sequence encoder. The method 1100 may further include, at block 1140, generating a second embeddings set for a candidate set. The elements of the candidate set may be documents in a candidate set 716, without positional encoding. The second embeddings set may be generated by a trained machine learning algorithm (e.g., from the training module 732), which may include a transformer encoder denoted as a set encoder.

The method 1100 may also include, at block 1150, determining a predicted set of documents (or document categories) based on the embeddings sets from blocks 1130 and 1140. In some embodiments, the predicted set may be one or more of the candidate sets 716. The predicted set may be determined as a set of documents corresponding to the second embeddings set that is most related to the first embeddings set, which may, in turn, be determined based on a relevance of a respective second embeddings set to the first embeddings set. In some embodiments, aggregated embeddings sets for both the first and second embeddings sets may be generated via a multi-layer attention model that takes the first and second embeddings sets as inputs. In these embodiments, an attention value based on the first embeddings set (e.g., the anchor sequence-based embeddings set) may be applied to the second embeddings set (e.g., the candidate set-based embeddings set), and an attention value based on the second embeddings set may be applied to the first embeddings set, to generate embeddings sets that are context-aware for both the anchor sequence and the candidate set.

The method 1100 may further include, at block 1160, presenting at least one document from the predicted set. The at least one document may be a document from the predicted set, or may be a document from a category in the predicted set. In some embodiments, a single document may be presented, and in other embodiments, multiple documents may be presented. The document(s) presented may be the document(s) in the predicted set that are not in the anchor set/sequence, such that the document being presented is not one with which the user previously interacted.

Figure 12:
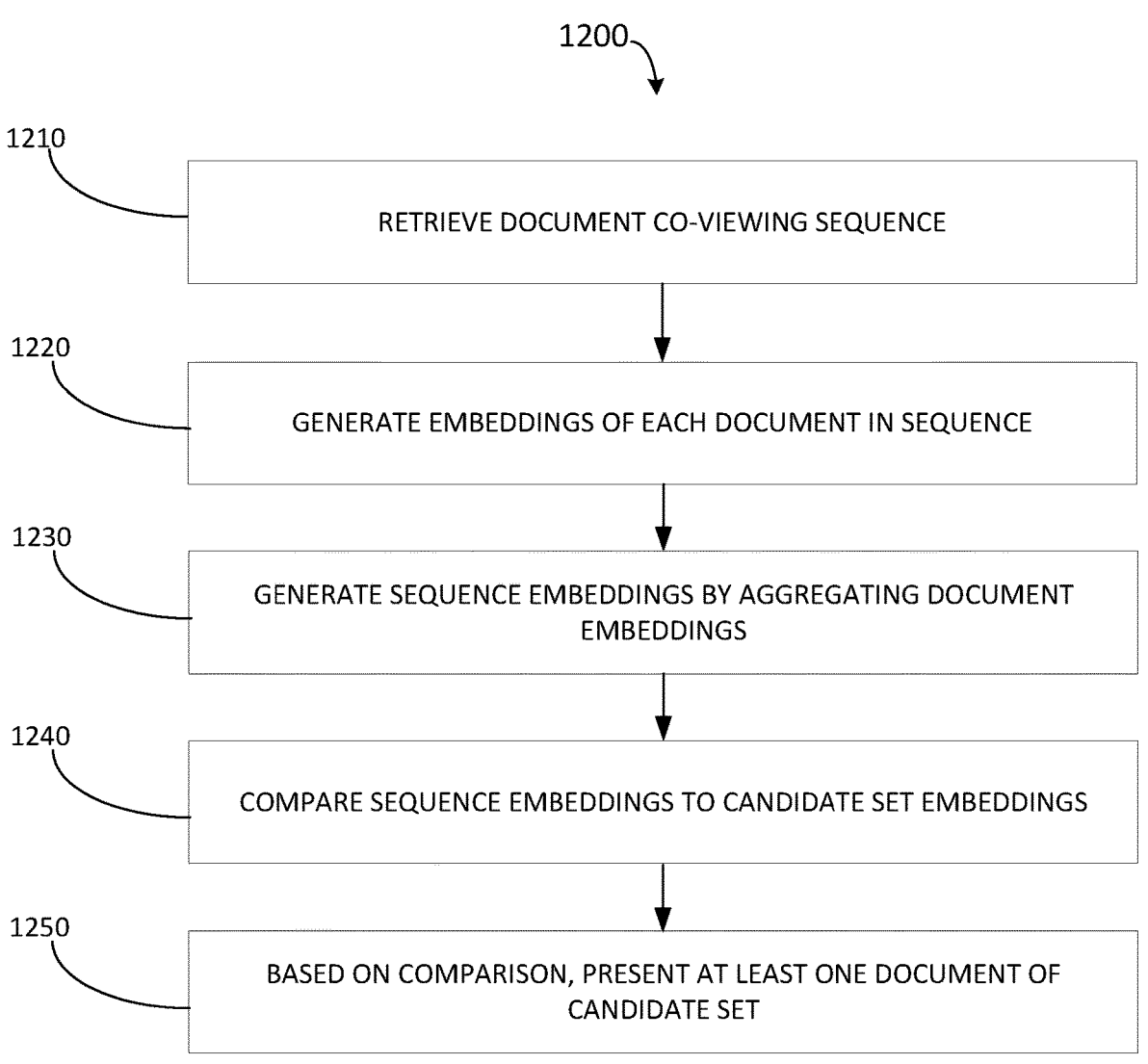
FIG. 12 is a flow chart illustrating an example method of providing document category recommendations to a user based on an anchor product and sequence of user activity.

FIG. 12 is a flow chart illustrating an example method 1200 of providing document category recommendations to a user based on an anchor product and sequence of user activity. The method 1200, or one or more portions of the method 1100, may be performed by the system 700, and more particularly by the document recommendation system 730, in some embodiments.

The method may include, at block 1210, retrieving a user sequence of interactions prior to the selection of the anchor document. The sequence of interactions may be the user co-viewing sequence 724, which may be retrieved from a database (e.g., user data 720) connected to the document recommendation system 730.

The method may also include, at block 1220, generating embeddings of each document in the retrieved sequence. As described above with reference to the sequence encoder 830, each embeddings may be encoded based not only on the content of the respective document but also on the relative position (e.g., positional or sequential encoding) of the document within the sequence.

The method may also include, at block 1230, generating an embeddings set for the retrieved sequence by aggregating the document embeddings from block 1220. As described above with reference to the sequence aggregator 850 (and set aggregator 860), the aggregation may include input based on embeddings sets generated for one or more candidate sets to which the retrieved sequence may be compared.

The method may also include, at block 1240, comparing the generated sequence embeddings set to one or more candidate embeddings set(s). The candidate embeddings set(s) may be generated based on the retrieved sequence embeddings set, such that each set may be encoded with the context of the other.

The method 1200 may further include, at block 1250, presenting at least one document from the candidate set. The at least one document may be a document from the candidate set, or may be a document from a category in the candidate set. In some embodiments, a single document may be presented, and in other embodiments, multiple documents may be presented. The document(s) presented may be the document(s) in the candidate set that are not in the retrieved sequence, such that the document being presented is not one with which the user previously interacted.

Presenting documents according to methods 900, 1000, 1100, and 1200 may provide numerous benefits over existing recommendation methods. First, by utilizing context (e.g., the user's sequence) around a user's selection to inform the recommendation, the system 700 provides a more accurate and relevant recommendation. Second, because the recommendation takes into account the context provided both by the set of user actions and the sequence of user actions, the recommendation avoids the pitfalls of systems that focus on one context to the detriment the other. Third, the system 700 utilizes a trained machine-learning algorithm, the human element is removed from recommendations, in contrast to existing recommendation methods that rely on human-curated lists and guides. Fourth, the system 700 provides for set-based negative sampling, which provides a more comprehensively-trained machine learning algorithm without sacrificing the set-based approach with an element-based training. Fifth, by improving and streamlining the users' experiences on the website, the processing strain on the server 130 is reduced, and overall performance of the server 130 (e.g., loading webpages, loading content, processing interactions) is improved. In particular, because document recommendations are dynamic and based on a user's current session, the recommendation is more tailored to the user and more likely to be relevant. As such, the user is likely to spend less time browsing and searching through the website, reducing their length of stay without losing a sale.

Figure 13:
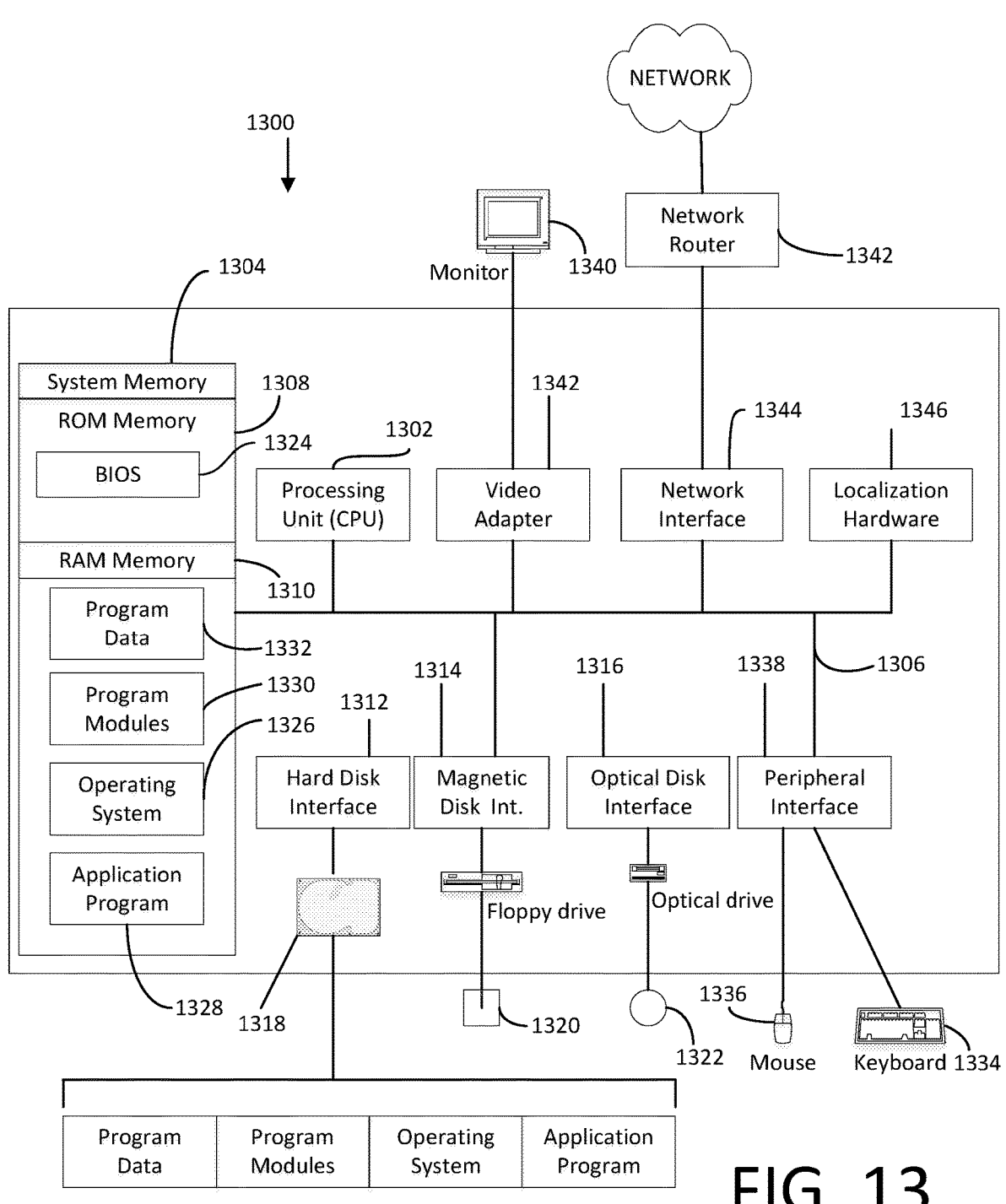
FIG. 13 is a diagrammatic view of an example embodiment of a user computing environment.

FIG. 13 is a diagrammatic view of an example embodiment of a user computing environment that includes a computing system environment 1300, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 1300 typically includes at least one processing unit 1302 and at least one memory 1304, which may be linked via a bus. Depending on the exact configuration and type of computing system environment, memory 1304 may be volatile (such as RAM 1310), non-volatile (such as ROM 1308, flash memory, etc.) or some combination of the two. Computing system environment 1300 may have additional features and/or functionality. For example, computing system environment 1300 may also include additional storage (removable and/or non-removable) including, but not limited to, magnetic or optical disks, tape drives and/or flash drives. Such additional memory devices may be made accessible to the computing system environment 1300 by means of, for example, a hard disk drive interface 1312, a magnetic disk drive interface 1314, and/or an optical disk drive interface 1316. As will be understood, these devices, which would be linked to the system bus, respectively, allow for reading from and writing to a hard disk 1318, reading from or writing to a removable magnetic disk 1320, and/or for reading from or writing to a removable optical disk 1322, such as a CD/DVD ROM or other optical media. The drive interfaces and their associated computer-readable media allow for the nonvolatile storage of computer readable instructions, data structures, program modules and other data for the computing system environment 1300. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1300.

A number of program modules may be stored in one or more of the memory/media devices. For example, a basic input/output system (BIOS) 1324, containing the basic routines that help to transfer information between elements within the computing system environment 1300, such as during start-up, may be stored in ROM 1308. Similarly, RAM 1310, hard disk 1318, and/or peripheral memory devices may be used to store computer executable instructions comprising an operating system 1326, one or more applications programs 1328 (which may include the functionality of the document recommendation system 730 of FIG. 7 or one or more of its functional modules 1306, 1308, for example), other program modules 1330, and/or program data 1332. Still further, computer-executable instructions may be downloaded to the computing environment 1300 as needed, for example, via a network connection.

An end-user may enter commands and information into the computing system environment 1300 through input devices such as a keyboard 1334 and/or a pointing device 1336. While not illustrated, other input devices may include a microphone, a joystick, a game pad, a scanner, etc. These and other input devices would typically be connected to the processing unit 1302 by means of a peripheral interface 1338 which, in turn, would be coupled to bus. Input devices may be directly or indirectly connected to processor 1302 via interfaces such as, for example, a parallel port, game port, firewire, or a universal serial bus (USB). To view information from the computing system environment 1300, a monitor 1340 or other type of display device may also be connected to bus via an interface, such as via video adapter 1342. In addition to the monitor 1340, the computing system environment 1300 may also include other peripheral output devices, not shown, such as speakers and printers.

The computing system environment 1300 may also utilize logical connections to one or more computing system environments. Communications between the computing system environment 1300 and the remote computing system environment may be exchanged via a further processing device, such a network router 1342, that is responsible for network routing. Communications with the network router 1342 may be performed via a network interface component 1344. Thus, within such a networked environment, e.g., the Internet, World Wide Web, LAN, or other like type of wired or wireless network, it will be appreciated that program modules depicted relative to the computing system environment 1300, or portions thereof, may be stored in the memory storage device(s) of the computing system environment 1300.

The computing system environment 1300 may also include localization hardware 1356 for determining a location of the computing system environment 1300. In embodiments, the localization hardware 1356 may include, for example only, a GPS antenna, an RFID chip or reader, a WiFi antenna, or other computing hardware that may be used to capture or transmit signals that may be used to determine the location of the computing system environment 1300.

The computing environment 1300, or portions thereof, may comprise one or more components of the system 700 of FIG. 7, in embodiments.

In some embodiments, a method for providing document category recommendations in an electronic user interface may include determining, for each category of a plurality of categories of documents accessible through the electronic user interface, a co-viewing relationship with each other category according to user activity on the interface. determining, according to the co-viewing relationships, one or more clusters, each cluster comprising two or more of the plurality of categories. receiving, from a user through the interface, a selection of an anchor document, the document being within an anchor category of the plurality of categories. and in response to receiving the user selection of the anchor document, presenting at least one other category that is in a cluster that includes the anchor category.

In some of these embodiments, the determination may include, for each category of a plurality of categories of documents accessible through the electronic user interface, a co-viewing relationship with each other category receiving data indicative of a plurality of document co-viewing sequences of the user activity. determining, with a machine learning algorithm, respective embeddings for each category, wherein the machine learning algorithm is trained according to the sequences. determining distances between the embeddings. and clustering categories that have embeddings that are within a threshold distance of each other.

In some of these embodiments, training the machine learning algorithm may include determining at least one of the plurality of document co-viewing sequences that includes a transaction. deriving one or more sub-sequences from the co-viewing sequences. and determining a set of training relationships based on the sub-sequences.

In some of these embodiments, the training relationships may include a plurality of sessions, each with at least one randomly masked document view, further wherein training the machine learning algorithm may include predicting each randomly masked document view with the machine learning algorithm.

In some of these embodiments, the method may further include receiving, from the user, a selection of a second anchor document, the second anchor document in a second anchor category. and in response to receiving the user selection of the second anchor document, presenting at least one other category that is in a cluster that includes the anchor category and the second anchor category.

In some of these embodiments, presenting the at least one other category may include determining, with a machine learning algorithm, an embeddings vector representative of a sequence of user inputs. The sequence of user inputs may include an order of the user selection of the anchor document, the user selection of the second anchor document, and one or more additional user selections. The presenting may further include matching the sequence embeddings vector with an embeddings vector from a set of cluster embeddings. and presenting at least one category from a cluster associated with the matched embeddings vector.

In some of these embodiments, the set of cluster embeddings may be determined offline from the one or more clusters prior to receiving the user selection of the anchor document.

In some embodiments, a system for providing document category recommendations in an electronic user interface may include a non-transitory, computer-readable medium storing instructions. and a processor configured to execute the instructions to determine, for each category of a plurality of categories of documents accessible through the electronic user interface, a co-viewing relationship with each other category according to user activity on the interface. determine, according to the co-viewing relationships, one or more clusters, each cluster comprising two or more of the plurality of categories. receive, from a user through the interface, a selection of an anchor document, the document being within an anchor category of the plurality of categories. and in response to receiving the user selection of the anchor document, presenting at least one other category that is in a cluster that includes the anchor category.

In some of these embodiments, determining, for each category of a plurality of categories of documents accessible through the electronic user interface, a co-viewing relationship with each other category, may include receiving data indicative of a plurality of document co-viewing sequences of the user activity. determining, with a machine learning algorithm, respective embeddings for each category. determining distances between the embeddings. and clustering categories that have embeddings that are within a threshold distance of each other. The machine learning algorithm may be trained according to the sequences.

In some of these embodiments, training the machine learning algorithm may include determine at least one of the plurality of document co-viewing sequences that includes a transaction. derive one or more sub-sequences from the co-viewing sequences. and determine a set of training relationships based on the sub-sequences.

In some of these embodiments, the processor may be further configured to receive, from the user, a selection of a second anchor document, the second anchor document in a second anchor category. and in response to receiving the user selection of the second anchor document, present, via the electronic user interface, at least one other category that is in a cluster that includes the anchor category and the second anchor category.

In some of these embodiments, presenting the at least one other category may include encode a sequence of user inputs, the sequence of user inputs comprising an order of the user selection of the anchor document, the user selection of the second anchor document, and additional user selections. match the encoded sequences with a cluster from a set of encoded clusters. and present, via the electronic user interface, at least one category from the matched cluster.

In some of these embodiments, the set of encoded clusters may be encoded offline prior to receiving the user selection of the anchor document.

In some of these embodiments, each document may be in a single category.

In some embodiments, a method for providing document category recommendations in an electronic user interface may include receiving, from a user through the interface, a selection of an anchor document, the anchor document being within an anchor category of a plurality of categories. accessing a selection history of the user prior to the selection of the anchor document. determining, via a machine learning algorithm, an anchor embeddings vector for a sequence comprising the anchor category and the selection history. matching the anchor embeddings vector to at least one of a plurality of cluster embeddings, each cluster embedding determined from a cluster of two or more of the plurality of categories. and in response to receiving the user selection of the anchor document, presenting at least one other category that is in the cluster associated with the matched at least one cluster embeddings.

In some of these embodiments, the method may further include receiving, from the user through the interface, a selection of a second anchor document, the second anchor document being within a second anchor category of the plurality of categories. updating the sequence to include the second anchor category. and determining, via the machine learning algorithm, an updated anchor embeddings vector for the sequence.

In some of these embodiments, the cluster of two or more of the plurality of categories may be determined based on co-viewing relationships among categories according to user activity on the interface.

In some of these embodiments, each document is in a single category.

In some of these embodiments, each document within a category may be related to every other document in a category.

In some of these embodiments, the machine learning algorithm may be trained by receiving data indicative of a plurality of document co-viewing sequences that include a transaction. deriving one or more sub-sequences from the co-viewing sequences. and determining a set of training relationships based on the sub-sequences.

In some embodiments, a method for providing document category recommendations may include training a machine learning algorithm by retrieving, from a database, one or more document co-viewing sequences. deriving one or more subsets from the one or more document co-viewing sequences. comparing the one or more subsets to a plurality of candidate sets, each candidate set comprising one or more categories of documents. based on the comparison, determining at least one candidate set related to each subset. and associating a respective subsequence of each subset with the at least one candidate set, the respective subsequence comprising a portion of the document co-viewing sequence not included in the derived subset. The method may further include receiving, from a user, a selection of an anchor document. retrieving a user co-viewing sequence. generating, via the trained machine learning algorithm, a sequence embeddings set based on the anchor document and the user co-viewing sequence. comparing the generated embeddings set to respective embeddings for a plurality of candidate sets. determining the candidate set closest to the generated embeddings. and presenting at least one category from the closest candidate set.

In some of these embodiments, training the machine learning algorithm may further include negatively associating the respective subsequence with at least one negative set generated by adding noise to the at least one of the plurality of candidate sets related to each subset.

In some of these embodiments, generating the sequence embeddings set based on the anchor document and the user co-viewing sequence may include generating, via the trained machine learning algorithm, document embeddings for each document. encoding the document embeddings with positional encoding to generate a sequence embeddings. and aggregating, via the trained machine learning algorithm, the sequence embeddings with a respective embedding for a candidate set of the plurality of candidate sets to generate the sequence embeddings set.

In some embodiments, a method for providing document category recommendations in an electronic user interface may include receiving, from a user through the interface, a selection of an anchor document. retrieving, from a database, a user sequence of interactions prior to the selection of the anchor document, the user sequence comprising an ordered set of selected documents. generating, via a machine learning algorithm, a first embeddings set for an anchor sequence, the anchor sequence comprising the anchor document and the user sequence. generating, via the machine learning algorithm, a second embeddings set for a candidate set, the candidate set comprising at least one document. determining a relevance value based on the first and second embeddings sets. and in response to the relevance value exceeding a threshold value, presenting the at least one document of the candidate set to the user through the interface.

In some of these embodiments, the method may further include determining an anchor embeddings set by aggregating the first embeddings set with the second embeddings set. determining a candidate embeddings set by aggregating the second embeddings set with the first embeddings set. The relevance value may be determined based on the anchor embeddings set and the candidate embeddings set.

In some of these embodiments, the aggregations may use a multi-layer attention model comprises that applies an attention function to the first embeddings set and to the second embeddings set.

In some of these embodiments, the determining the relevance value may include retrieving a plurality of candidate sets, each candidate set comprising one or more documents. generating an embeddings set for each of the plurality of candidate sets. determining, by the machine learning algorithm, a relevance value for the first embeddings set relative to each candidate embeddings set. and determining a predicted set as the candidate set corresponding to the candidate embeddings set with a highest relevance value.

In some of these embodiments, the method may further include determining respective embeddings for each candidate set. The relevance value may be a determined distance between the second embeddings set and the respective embeddings for each candidate set.

In some of these embodiments, the machine learning algorithm may be trained based on co-viewing sequences from a plurality of users.

In some of these embodiments, training the machine learning algorithm may include deriving a subset of documents from a co-viewing sequence. retrieving a plurality of candidate sets, each candidate set comprising one or more documents. determining a relevance value for the subset relative to each of the plurality of candidate sets. determining at least one of the plurality of candidate sets with the relevance value above a threshold. and associating the at least one of the plurality of candidate sets with a subsequence of documents, the subsequence of documents comprising documents from the co-viewing sequence not included in the derived subset.

In some of these embodiments, training the machine learning algorithm may further include negative sampling.

In some of these embodiments, negative sampling may include negatively associating the subsequence with at least one negative set generated by adding noise to the at least one of the plurality of candidate set with the relevance value above the threshold.

In some of these embodiments, an amount of added noise may be based on an accuracy of the machine learning algorithm.

In some of these embodiments, the at least one presented document may include all documents in the candidate set.

In some of these embodiments, the at least one presented document may include all documents in the candidate set, excluding the documents that are included in the anchor set.

In some of these embodiments, the anchor document may be within an anchor category. and the at least one presented document may include all documents in the candidate set, excluding the documents that are within the anchor category.

In some of these embodiments, the candidate set may be one a plurality of candidate sets determined by receiving data indicative of a plurality of document co-viewing sequences, each document in each document co-viewing sequence belonging to a category. determining, with a second machine learning algorithm, respective embeddings for each category, wherein the machine learning algorithm may be trained according to the co-viewing sequences. determining distances between the embeddings. and generating the plurality of candidate sets as clusters of categories that have embeddings that are within a threshold distance of each other.

In some embodiments, a system for providing document category recommendations in an electronic user interface may include a processor. and a non-transitory, computer-readable medium storing instructions that, when executed by the processor, cause the system to retrieve a document co-viewing sequence of a user. generate, via a machine learning algorithm, respective embeddings of each document in the document co-viewing sequence. generate a sequence embeddings by aggregating the document embeddings of the document co-viewing sequence. compare the sequence embeddings to respective embeddings of one or more candidate sets. and based on the comparison, present at least one document of the candidate set with a respective embedding closest to the sequence embeddings.

In some of these embodiments, the machine learning algorithm may be trained using training data based on document co-viewing sequences and document candidate sets.

In some of these embodiments, the machine learning algorithm may be further trained using set-based negative sampling.

While this disclosure has described certain embodiments, it will be understood that the claims are not intended to be limited to these embodiments except as explicitly recited in the claims. On the contrary, the instant disclosure may be intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed:

1. A method for using a machine learning model to provide document category recommendations in an electronic user interface, the method comprising:

receiving, via the electronic user interface, user activity comprising co-viewing sequences of documents, each document being associated with one or more categories of a plurality of categories;

automatically determining co-viewing relationships between categories of the documents based on one or more clusters of embeddings and the co-viewing sequences of documents, the embeddings being representative of each respective category of documents, each cluster comprising two or more categories of the plurality of categories;

receiving, through the electronic user interface, a user selection of an anchor document, the anchor document being within an anchor category of the plurality of categories; and in response to receiving the user selection of the anchor document, automatically presenting at least one other category of documents that is in a cluster that includes the anchor category at the electronic user interface, wherein, in response to the anchor category being in a plurality of clusters, automatically presenting one or more other categories of documents from each cluster of the plurality of clusters, wherein automatically presenting the one or more other categories of documents from each cluster of the plurality of clusters comprises:

generating a first embeddings set based on the anchor document and a user co-viewing sequence of the anchor document;

determining a second embeddings set that is nearest to the first embeddings set based on comparing the first embeddings set to respective embeddings of each cluster of the plurality of clusters; and determining, for each cluster of the plurality of clusters, a category of documents of the one or more other categories of documents based on a match between the second embeddings set and the first embedding set.

2. The method of claim 1, wherein automatically determining the co-viewing relationships between the categories of the documents based on the one or more clusters of embeddings comprises:

training a machine learning algorithm using training data of the co-viewing sequences of documents;

determining, with the trained machine learning algorithm, respective embeddings for each category of the documents;

determining distances between the embeddings; and providing the one or more clusters based on clustering categories that have embeddings that are within a threshold distance of each other.

3. The method of claim 2, wherein training the machine learning algorithm comprises:

determining at least one of the co-viewing sequences of documents that includes a transaction;

deriving one or more sub-sequences from the co-viewing sequences of documents that includes the transaction; and determining a set of training relationships based on the one or more sub-sequences.

4. The method of claim 3, wherein the set of training relationships comprise a plurality of sessions of user activity at the electronic user interface, each session with at least one randomly masked document view, further wherein training the machine learning algorithm comprises predicting each randomly masked document view with the machine learning algorithm.

5. The method of claim 1, the method further comprising:

receiving, via the electronic user interface, a second user selection of a second anchor document, the second anchor document being within a second anchor category of the plurality of categories; and in response to receiving the user selection of the second anchor document, automatically presenting at least one other category of documents that is in a cluster that includes the anchor category and the second anchor category at the electronic user interface.

6. The method of claim 5, wherein presenting the at least one other category comprises:

determining, with a machine learning algorithm, a sequence embeddings vector representative of a sequence of user inputs, the sequence of user inputs comprising an order of the user selection of the anchor document, the user selection of the second anchor document, and one or more additional user selections;

matching the sequence embeddings vector with an embeddings vector from a set of cluster embeddings; and presenting at least one category of documents from a cluster associated with the matched embeddings vector.

7. The method of claim 6, wherein the set of cluster embeddings are determined offline from the one or more clusters prior to receiving the user selection of the anchor document.

8. A system for providing document category recommendations in an electronic user interface, the system comprising:

a non-transitory, computer-readable medium storing instructions; and a processor configured to execute the instructions to:

receive, via the electronic user interface, user activity comprising co-viewing sequences of documents;

determine co-viewing relationships between categories of the documents based on one or more clusters of embeddings and the co-viewing sequences of documents, the embeddings being representative of each respective category of documents, each cluster comprising two or more categories of the one or more of categories;

receive, through the interface, a user selection of an anchor document during a user session, the anchor document being within an anchor category of a plurality of categories of documents;

determine a cluster that matches with the user selection of the anchor document in the one or more clusters; and in response to receiving the user selection of the anchor document, presenting at least one other category of documents that is in the cluster that includes the anchor category at the electronic user interface, wherein, in response to the anchor category being in a plurality of clusters, automatically presenting one or more other categories of documents from each cluster of the plurality of clusters wherein automatically presenting the one or more other categories of documents from each cluster of the plurality of clusters comprises:

generate a first embeddings set based on the anchor document and a user co-viewing sequence of the anchor document;

determine a second embeddings set that is nearest to the first embeddings set based on comparing the first embeddings set to respective embeddings of each cluster of the plurality of clusters; and determining, for each cluster of the plurality of clusters, a category of documents of the one or more other categories of documents based on embeddings of the second embeddings set being nearest to corresponding embeddings of the first embedding set.

9. The system of claim 8, wherein determining the co-viewing relationships between the categories of the documents based on the one or more clusters of embeddings comprises:

train a machine learning algorithm using training data of the co-viewing sequences of documents;

determine, with the machine learning algorithm, respective embeddings for each category of the documents;

determine distances between the respective embeddings; and providing the one or more clusters based on clustering categories that have embeddings that are within a threshold distance of each other.

10. The system of claim 9, wherein training the machine learning algorithm comprises:

determine at least one of the co-viewing sequences of documents that includes a transaction;

derive one or more sub-sequences from the co-viewing sequences of documents that includes the transaction; and determine a set of training relationships based on the one or more sub-sequences.

11. The system of claim 8, wherein the processor is further configured to:

receive, through the electronic user interface, a user selection of a second anchor document during the user session, the second anchor document being within a second anchor category of the plurality of categories; and in response to receiving the user selection of the second anchor document, present, via the electronic user interface, at least one other category of documents that is in a cluster that includes the anchor category and the second anchor category.

12. The system of claim 11, wherein presenting the at least one other category of documents comprises:

determine a sequence of user inputs comprising an order of the user selection of the anchor document, the user selection of the second anchor document, and additional user selections;

match the sequence of user inputs with at least one category of documents in a cluster of the one or more clusters; and present, via the electronic user interface, the at least one category of documents from the matched cluster.

13. The system of claim 12, wherein a set of cluster embeddings are determined offline for each of the one or more clusters prior to receiving the user selection of the anchor document, and the at least one category of documents is determined from the sets of cluster embeddings.

14. The system of claim 8, wherein each document is in a single category.

15. A method for providing document category recommendations in an electronic user interface, the method comprising:

receiving, from a user through the interface, a user selection of an anchor document during a user session, the anchor document being within an anchor category of a plurality of categories of documents;

accessing a selection history of the user during a time period prior to the selection of the anchor document; and in response to receiving the user selection of the anchor document, automatically presenting a document from at least one other category based on the anchor document and the selection history of the user, wherein automatically presenting the document comprises:

determining, via a machine learning algorithm, an anchor embeddings vector for a sequence comprising the anchor category and the selection history;

determining co-viewing relationships between the plurality of categories of documents based on a plurality of clusters, each cluster comprising embeddings representative of two or more categories of the plurality of categories of documents; and determining a cluster of the plurality of clusters that matches with the selection of the anchor document based on matching the anchor embeddings vector to at least one of the embeddings of the matched cluster, wherein the presented document is from the matched cluster, wherein determining the cluster of the plurality of clusters that matches with the selection of the anchor document based on matching the anchor embeddings vector to at least one of the embeddings of the matched cluster comprises:

generating a sequence embeddings set based on the anchor document and a user co-viewing sequence of the anchor document;

determining a candidate embeddings set that is nearest to the sequence embeddings set based on a comparison to respective embeddings of each cluster of the plurality of clusters; and determining, for the cluster of the plurality of clusters, a category of documents of the one or more other categories of documents based on a match between the candidate embeddings set and the sequence embeddings set.

16. The method of claim 15, further comprising:

receiving, from the user through the interface, a user selection of a second anchor document during the user session, the second anchor document being within a second anchor category of the plurality of categories of documents;

updating the sequence to include the second anchor category; and determining, via the machine learning algorithm, an updated anchor embeddings vector for the sequence.

17. The method of claim 15, wherein the matched cluster is determined based on co-viewing relationships among categories of documents according to user activity on the interface.

18. The method of claim 15, wherein each document is in a single category.

19. The method of claim 15, wherein each document within a category is related to every other document in a category.

20. The method of claim 15, wherein the machine learning algorithm is trained by:

receiving data indicative of a plurality of document co-viewing sequences that include a transaction;

deriving one or more sub-sequences from the co-viewing sequences of documents that includes the transaction; and determining a set of training relationships based on the one or more sub-sequences.

21. A method for providing document category recommendations, the method comprising:

training a machine learning algorithm by:

retrieving, from a database, one or more document co-viewing sequences, the document co-viewing sequences based on user activity through an electronic user interface;

deriving one or more subsets from the one or more document co-viewing sequences based on a criterion;

providing a plurality of candidate sets of documents based on the one or more document co-viewing sequences, each candidate set comprising one or more categories of documents;

automatically determining at least one candidate set related to each subset of the one or more subsets based on the one or more categories of documents in each of the plurality of candidate sets;

associating a respective subsequence of each subset with the at least one candidate set, the respective subsequence comprising a portion of the one or more document co-viewing sequence not included in the derived subset;

receiving, from a user through the electronic user interface, a user selection of an anchor document;

retrieving a user co-viewing sequence; and automatically presenting at least one category of documents from a closest candidate set of the plurality of candidate sets, the closest candidate set including an anchor category of the anchor document, wherein automatically presenting the at least one category of documents comprises:

generating, via the trained machine learning algorithm, a sequence embeddings set based on the anchor document and the user co-viewing sequence;

determining a candidate set that matches with the sequence embeddings set based on comparing the generated sequence embeddings set to respective embeddings for the plurality of candidate sets; and wherein the determined candidate set comprises embeddings closest to the generated embeddings of the sequence embeddings set.

22. The method of claim 21, wherein training the machine learning algorithm further comprises negatively associating the respective subsequence with at least one negative set generated by adding noise to the at least one of the plurality of candidate sets related to each subset.

23. The method of claim 21, wherein generating the sequence embeddings set based on the anchor document and the user co-viewing sequence comprises:

generating, via the trained machine learning algorithm, document embeddings for each document;

encoding the document embeddings with positional encoding to generate a sequence embeddings; and aggregating, via the trained machine learning algorithm, the sequence embeddings with a respective embedding for a candidate set of the plurality of candidate sets to generate the sequence embeddings set.

24. A method for providing document category recommendations in an electronic user interface, the method comprising:

providing one or more candidate sets based on encoding a plurality of categories of documents into the one or more candidate sets using a clustering algorithm, each candidate set having embeddings based on document co-viewing sequences from user activity through the electronic user interface;

receiving, from a user through the electronic user interface, a selection of an anchor document;

retrieving, from a database, a user sequence of interactions prior to the selection of the anchor document, the user sequence comprising an ordered set of selected documents; and automatically presenting at least one document associated with a candidate set of the one or more candidate sets to the user through the electronic user interface based on the anchor document and the user sequence, wherein automatically presenting the at least one document associated with the candidate set of the one or more candidate sets comprises:

generating, via a machine learning algorithm, a first embeddings set for an anchor sequence, the anchor sequence comprising the anchor document and the user sequence associated with the anchor document;

generating, via the machine learning algorithm, a second embeddings set for each of the one or more candidate sets based on comparing the first embeddings set to respective embeddings of the one or more candidate sets;

determining relevance values based on a location of respective embeddings of the first and second embeddings sets; and determining the candidate set of the one or more candidate sets that matches with the first embeddings set based on the relevance values, the candidate set associated with the at least one document, wherein the at least one document of the candidate set is automatically presented to the user through the electronic user interface in response to the relevance values exceeding a threshold value.

25. The method of claim 24, further comprising:

determining an anchor embeddings set by aggregating the first embeddings set with the second embeddings set; and determining a candidate embeddings set by aggregating each second embeddings set with the first embeddings set;

wherein the relevance value is determined based on the anchor embeddings set and the candidate embeddings set.

26. The method of claim 25, wherein the aggregations use a multi-layer attention model comprises that applies an attention function to the first embeddings set and to the second embeddings set.

27. The method of claim 24, wherein the determining of the relevance value comprises:

generating a candidate embeddings set for each of the one or more candidate sets;

determining, by the machine learning algorithm, a relevance value for the first embeddings set relative to each candidate embeddings set; and determining a predicted set as the candidate set corresponding to the candidate embeddings set with a highest relevance value.

28. The method of claim 27, further comprising determining respective embeddings for each candidate set, wherein the relevance value is a determined distance between the second embeddings set and the respective embeddings for each candidate set.

29. The method of claim 24, wherein the machine learning algorithm is trained based on co-viewing sequences from a plurality of users.

30. The method of claim 29, wherein training the machine learning algorithm comprises:

deriving a subset of documents from a co-viewing sequence of documents;

retrieving the one or more candidate sets, each candidate set comprising one or more documents;

determining a relevance value for the subset of documents relative to each of the one or more candidate sets;

determining at least one of the one or more candidate sets with the relevance value above a threshold; and associating the at least one of the one or more candidate sets with a sub-sequence of documents, the sub-sequence of documents comprising documents from the co-viewing sequence not included in the derived subset.

31. The method of claim 30, wherein training the machine learning algorithm further comprises negative sampling.

32. The method of claim 31, wherein negative sampling comprises negatively associating the sub-sequence with at least one negative set generated by adding noise to the at least one of the plurality of candidate set with the relevance value above the threshold.

33. The method of claim 32, wherein an amount of added noise is based on an accuracy of the machine learning algorithm.

34. The method of claim 24, wherein the at least one presented document comprises all documents in the candidate set.

35. The method of claim 24, wherein the at least one presented document comprises all documents in the candidate set, excluding the documents that are included in the anchor set.

36. The method of claim 24, wherein:

the anchor document is within an anchor category; and the at least one presented document comprises all documents in the candidate set, excluding the documents that are within the anchor category.

37. The method of claim 24, wherein the candidate set is one of the one or more candidate sets determined by:

receiving data indicative of a plurality of document co-viewing sequences, each document in each document co-viewing sequence belonging to a category;

determining, with a second machine learning algorithm, respective embeddings for each category, wherein the machine learning algorithm is trained according to the co-viewing sequences;

determining distances between the respective embeddings; and generating the one or more candidate sets as clusters of categories that have embeddings that are within a threshold distance of each other.

38. A system for providing document category recommendations in an electronic user interface, the system comprising:

a processor; and a non-transitory, computer-readable medium storing instructions that, when executed by the processor, cause the system to:

retrieve, via the electronic user interface, a user activity of a user during a session;

determine, by a processor, a document co-viewing sequence based on the user activity of the user, the document co-viewing sequence comprising one or more documents from a plurality of categories and represented by one or more embedding clusters;

determine, by the processor, a candidate set of a plurality of candidate sets that matches with the document co-viewing sequence in response to a user selection received at the electronic user interface of an anchor document from an anchor category, the anchor document comprising one or more embeddings located in the one or more embedding clusters; and automatically present at least one document of the candidate set that most closely matches with the anchor document from the document co-viewing sequence to the electronic user interface;

wherein determining the document co-viewing sequence of the user comprises:

generate, via a machine learning algorithm, respective embeddings of each document in the document co-viewing sequence; and generate a sequence embeddings by aggregating the document embeddings of the document co-viewing sequence into the one or more embedding clusters; and wherein determining the candidate set of the plurality of candidate sets comprises:

encode, according to co-viewing relationships, a plurality of categories of documents into the plurality of candidate sets;

determine a category of documents of the plurality of plurality of categories corresponding to the candidate set of the plurality of candidate sets from an embedding cluster that matches with the anchor document from the sequence embeddings based on comparing the one or more embeddings of the anchor document to respective embeddings of the sequence embeddings to respective embeddings of the plurality of candidate sets; and determine at least one other category of documents of the plurality of categories based on the from at least one other embedding cluster of the one or more embedding clusters that matches with the anchor document based on comparing the one or more embeddings representative of the anchor document to the respective embeddings of between the candidate set and the sequence embeddings.

39. The system of claim 38, wherein the machine learning algorithm is trained using training data based on document co-viewing sequences and document candidate sets.

40. The system of claim 39, wherein the machine learning algorithm is further trained using set-based negative sampling.

* * * * *